US010594225B1

(12) United States Patent
Lin et al.

(10) Patent No.: US 10,594,225 B1
(45) Date of Patent: Mar. 17, 2020

(54) INTERLEAVED LLC HALF-BRIDGE SERIES RESONANT CONVERTER HAVING INTEGRATED TRANSFORMER

(71) Applicant: Jing-Yuan Lin, New Taipei (TW)

(72) Inventors: Jing-Yuan Lin, New Taipei (TW); Zong-Sian Jiang, Yunlin County (TW); Sih-Yi Lee, Taipei (TW); Huang-Jen Chiu, New Taipei (TW)

(73) Assignee: Jing-Yuan Lin, New Taipei (TW)

( * ) Notice: Subject to any disclaimer, the term of this patent is extended or adjusted under 35 U.S.C. 154(b) by 0 days.

(21) Appl. No.: 16/278,394

(22) Filed: Feb. 18, 2019

(30) Foreign Application Priority Data

Sep. 12, 2018 (TW) .............................. 107132062 A

(51) Int. Cl.
H02M 3/335 (2006.01)
H02M 1/42 (2007.01)

(52) U.S. Cl.
CPC ..... *H02M 3/33592* (2013.01); *H02M 1/4233* (2013.01)

(58) Field of Classification Search
CPC .... H02M 3/337; H02M 3/3376; H02M 3/335; H02M 3/33569; H02M 3/1584
See application file for complete search history.

(56) References Cited

U.S. PATENT DOCUMENTS

| 2011/0299301 | A1* | 12/2011 | Huang | ................. H02M 3/3376 363/17 |
| 2011/0316430 | A1* | 12/2011 | Cohen | ............... H02M 3/33561 315/161 |
| 2015/0357921 | A1* | 12/2015 | Li | ......................... H02M 3/285 363/21.02 |
| 2017/0093299 | A1* | 3/2017 | Norimatsu | ............ H02M 5/458 |
| 2017/0170733 | A1* | 6/2017 | Ferencz | ............ H02M 3/33569 |
| 2017/0214330 | A1* | 7/2017 | Yang | ..................... H02M 3/285 |
| 2017/0331383 | A1* | 11/2017 | Hsiao | ................ H02M 3/33546 |
| 2018/0323720 | A1* | 11/2018 | Njiende | ........... H02M 3/33569 |

(Continued)

FOREIGN PATENT DOCUMENTS

| CN | 106374749 A | 2/2017 |
| TW | 200950294 A | 12/2009 |

(Continued)

*Primary Examiner* — Jeffrey A Gblende
*Assistant Examiner* — Nusrat Quddus
(74) *Attorney, Agent, or Firm* — Li & Cai Intellectual Property (USA) Office

(57) ABSTRACT

An interleaved LLC half-bridge series resonant converter having an integrated transformer includes a power supply, a magnetic core, a first converter, a second converter and an output load circuit. The magnetic core has first and second outer columns and a center column. The first converter includes a first switch circuit, a first resonant tank, a first transformer, and a first rectifier circuit. The first transformer is coupled to the first resonant tank and includes a first primary winding wound on the first outer column and a first secondary winding wound on the second outer column. The second converter includes a second switch circuit, a second resonant tank, a second transformer and a second rectifier circuit. The second transformer is coupled to the second resonant tank and includes a second primary winding wound on the first outer column and a second secondary winding wound on the second outer column.

9 Claims, 19 Drawing Sheets

(56) References Cited

U.S. PATENT DOCUMENTS

2018/0342953 A1* 11/2018 Ji ............................... H01F 3/12
2018/0351469 A1* 12/2018 Kakalashvili ..... H02M 3/33592

FOREIGN PATENT DOCUMENTS

| TW | 201103246 A | 1/2011 |
| TW | 201332274 A | 8/2013 |
| TW | 201720036 A | 6/2017 |

* cited by examiner

INTERLEAVED LLC HALF-BRIDGE SERIES RESONANT CONVERTER HAVING INTEGRATED TRANSFORMER

CROSS-REFERENCE TO RELATED PATENT APPLICATION

This application claims the benefit of priority to Taiwan Patent Application No. 107132062, filed on Sep. 12, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an LLC half-bridge series resonant converter, and more particularly to an interleaved LLC half-bridge series resonant converter having an integrated transformer.

BACKGROUND OF THE DISCLOSURE

In recent years, with an increasing shortage of energy, the growth of environmental awareness, the rapid development of science and technology, the population explosion, and a growing demand for electricity, it has become an urgent issue to search for alternative energy and to effectively save energy. With the continuous progress in semiconductor manufacturing process, switching power supply has been widely used in all kinds of electronic products, and most electronic products are developed for miniaturization and high power density to meet market demand. For these purposes, the switching frequency of switching power supply should be increased so as to reduce the volume of magnetic components.

Since the switching frequency is increased, the switching loss during the switching of the power switch assembly between ON and OFF states is increased. When an LLC Series Resonant Converter (LLC-SRC) is operated in a low voltage-high current output mode, since the output current of the secondary side is semi-sinusoidal current, an excessive ripple current is generated at the output terminal as the output current rises.

Therefore, to overcome the above defects structure, it has become an important issue in the art to improve the converter structure.

SUMMARY OF THE DISCLOSURE

In response to the above-referenced technical inadequacies, the present disclosure provides an interleaved LLC half-bridge series resonant converter with an integrated transformer.

In one aspect, the present disclosure provides an interleaved LLC half-bridge series resonant converter with an integrated transformer, which includes a power supply, a magnetic core, a first converter, a second converter and an output load circuit. The magnetic core has a first outer column, a center column and a second outer column. The first converter includes a first switch circuit, a first resonant tank, a first transformer, and a first rectifier circuit. The first switch circuit is configured to control a first input voltage and a first input current from the power supply. The first resonant tank is coupled to the first switch circuit, which includes a first resonant inductor, a first resonant capacitor and a first magnetizing inductor. The first transformer is coupled to the first resonant tank, which includes a first primary winding wound on the first outer column and a first secondary winding wound on the second outer column. The first rectifier circuit is configured to receive and rectify an output voltage and an output current of the first transformer. The second converter includes a second switch circuit, a second resonant tank, a second transformer and a second rectifier circuit. The second switch circuit is configured to control a second input voltage and a second input current from the power supply. The second resonant tank is coupled to the second switch circuit, which includes a second resonant inductor, a second resonant capacitor and a second magnetizing inductor. The second transformer is coupled to the second resonant tank, which includes a second primary winding wound on the first outer column and a second secondary winding wound on the second outer column. The second rectifier circuit is configured to receive and rectify an output voltage and an output current of the second transformer. The output load circuit is respectively coupled to the first rectifier circuit and the second rectifier circuit, which has an output capacitor and a load.

One of the advantages of the present disclosure is that the interleaved LLC half-bridge series resonant converter having an integrated transformer provided by the present disclosure can reduce output current ripple and improve efficiency by utilizing two series-coupled LLC-SRCs combined with a mechanism of phase shift of 90°.

One of the advantages of the present disclosure is that the interleaved LLC half-bridge series resonant converter having an integrated transformer provided by the present disclosure can reduce errors of two transformers to achieve current-sharing for the secondary currents by utilizing a technique of magnetic integration to integrate two transformers into one magnetic core, and by replacing the conventional winding frame-wound transformer with a plate transformer.

In order to further understand the characteristics and technical contents of the present disclosure, the following detailed descriptions and drawings related to the present disclosure are provided. However, drawings are provided for the purpose of illustration and explanation, and are not intended to limit the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
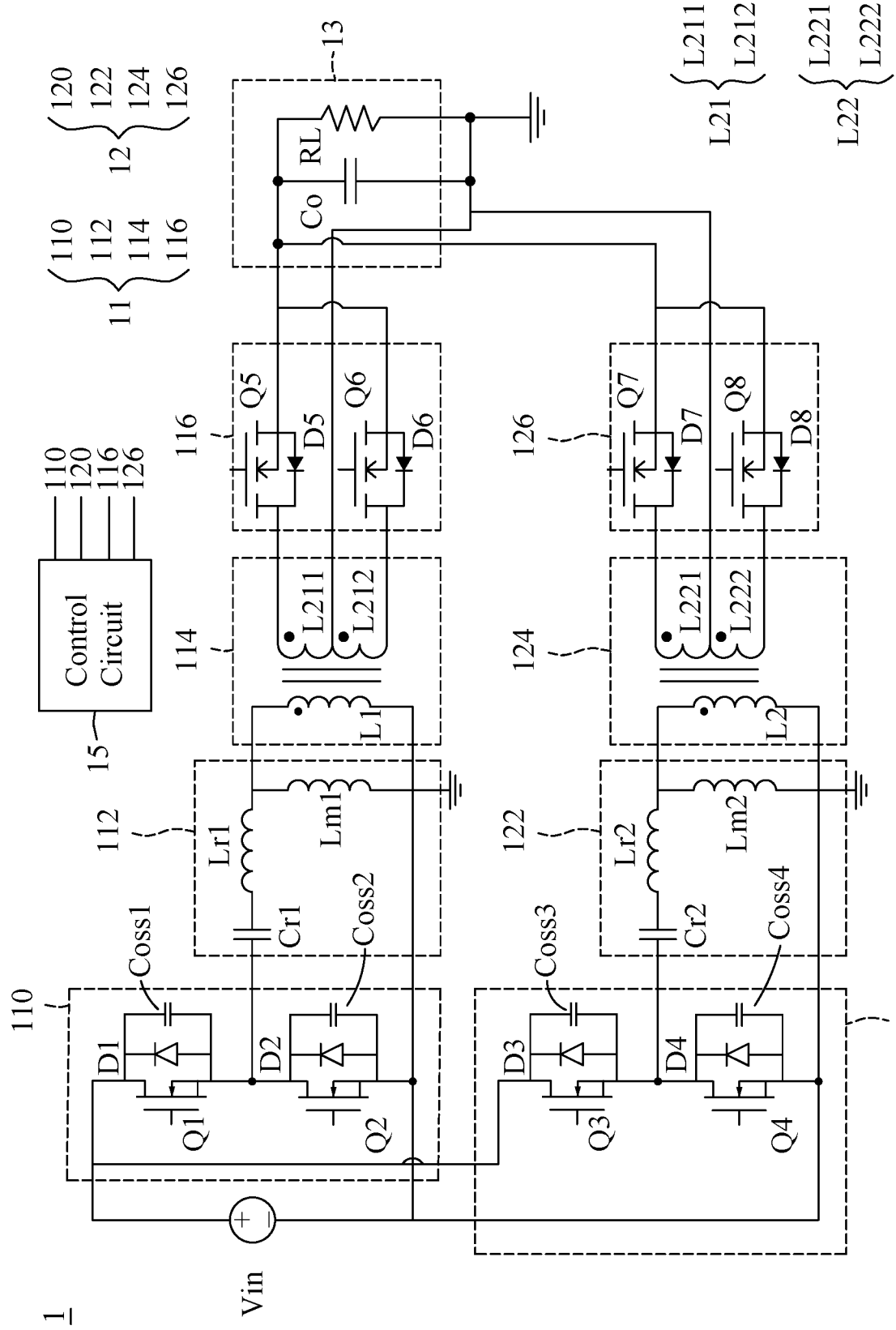
FIG. 1 is a circuit layout of an interleaved LLC half-bridge series resonant converter having an integrated transformer of an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

"INTERLEAVED LLC HALF-BRIDGE SERIES RESONANT CONVERTER HAVING INTEGRATED TRANSFORMER" of the present disclosure is described as follows. Those skilled in the art can understand advantages and effects of the present disclosure from the contents disclosed in the specification. The present disclosure can be implemented or applied in various other specific embodiments, and various modifications and changes can be made without departing from the spirit and scope of the present disclosure. In addition, the drawings of the present disclosure are merely illustrative and are not intended to be in the actual size. The following embodiments will further explain the related technical content of the present disclosure, but is not intended to limit the scope of the present disclosure.

It should be understood that, although the terms "first", "second", "third", and the like may be used herein to describe various elements or signals, however, these elements or signals are not limited by these terms. These terms are primarily used to distinguish one element from another or one signal from another. In addition, the term "or" as used herein may include a combination of any one or more of the associated listed items, depending on the actual situation.

Reference is now made to FIG. 1. An interleaved LLC half-bridge series resonant converter 1 having an integrated transformer is provided according to an embodiment of the present disclosure, and includes a power source Vin, a first converter 11, a second converter 12, and an output load circuit 13 and a magnetic core 14.

The first converter 11 includes a first switch circuit 110, a first resonant tank 112, a first transformer 114 and a first rectifier circuit 116. The first switch circuit 110 is configured to control a first input voltage and a first input current from the power source Vin.

The first resonant tank 112 is coupled to the first switch circuit 110 and includes a first resonant inductor Lr1, a first resonant capacitor Cr1, and a first magnetizing inductor Lm1. The first transformer 114 is coupled to the first resonant tank 112, and includes a first primary side winding L1 wound on a first outer column OP1 and a first secondary side winding L21 wound on a second outer column OP2. The first rectifier circuit 116 is used to receive and rectify an output voltage and output current of the first transformer 114.

The second converter 12 includes a second switch circuit 120, a second resonant tank 122, a second transformer 124, and a second rectifier circuit 126. The second switching circuit 120 is configured to control a second input voltage and a second input current from the power source Vin. The second resonant tank 122 is coupled to the second switch circuit 120, and includes a second resonant inductor Lr2, a second resonant capacitor Cr2, and a second magnetizing inductor Lm2. The second transformer 124 is coupled to the second resonant tank 122, and includes a second primary side winding L2 wound on the first outer column OP1 and a second secondary winding L22 wound on the second outer column OP2. The second rectifier circuit 126 is used to receive and rectify an output voltage and output current of the second transformer 124.

The output load circuit 13 is coupled to the first rectifier circuit 116 and the second rectifier circuit 126, respectively, having an output capacitor Co and a load RL. The output capacitor Co is used for filtering and the load RL acts as a load impedance of an output end.

The present disclosure utilizes two LLC half-bridge series resonant converters in parallel, as shown in FIG. 1. In detail, the half-bridge series resonant circuit operates in a series resonant converter (SRC) resonance mode and an LLC (LLC-Type Series Resonant Converter) resonance mode, respectively. Taking the first transformer 11 as an example, the first magnetizing inductor Lm1 determines whether to participate in resonance according to different switching operation regions. In the SRC mode, the first magnetizing inductor Lm1 does not participate in resonance, the first resonant frequency is determined by the first resonant inductor Lr1 and the first resonant capacitor Cr1. Since the first resonant inductor Lr, the first resonant capacitor Cr1 of the resonant circuit, and the load are in series, the maximum voltage gain for the SRC resonant mode is generated when a switching frequency fsw operates with a first resonant frequency FR1, as shown in the following formula (1):

$$fsw = fr1 = \frac{1}{2\pi\sqrt{LrCr}} \quad \text{formula (1)}$$

In the LLC mode, the first magnetizing inductor Lm1 participates in resonance, and forms a resonant network with the first resonant inductor Lr1 and the first resonant capacitor Cr1. The first magnetizing inductor Lm1 merges with the first resonant inductor Lr1, and then produces a second resonant frequency fr2 with the first resonant capacitor Cr1, as shown in the following formula (2):

$$fr2 = \frac{1}{2\pi\sqrt{(Lr+Lm)Cr}} \quad \text{formula (2)}$$

Two resonant frequency points can divide three intervals on the frequency response curve, that is, the two resonant frequency points are the first resonant frequency fr1 and the second resonant frequency fr2. The biggest difference between the operations in LLC mode and in the SRC mode is that the voltage gain of the LLC mode is greater than 1. In addition, zero voltage switching conditions of a power transistor in this operation mode is only related to the first magnetizing inductor Lm1, but not related to the output current. In other words, the zero voltage switching conditions can be satisfied as long as the current on the magnetizing inductor is large enough.

On the other hand, when the converter switches to the switching frequency fsw to be operated in the LLC mode, an operating frequency is smaller than the first resonant frequency fr1 and greater than the second resonant frequency fr2. The resonant current is decreased to be equal to a magnetizing current before the switch is cutoff. When the resonant current is equal to the magnetizing current, the current does not flow into the primary side of the first transformer 114, and no energy is transferred to the load end. The output rectifier switch reaches zero-current cutoff since there is no current flowing through, and thus the output voltage cannot clamp the first magnetizing inductor Lm1 with the first transformer 114 via the output rectifier switch. In this region, the resonant element includes the first resonant inductor Lr1, the first resonant capacitor Cr1, and the first magnetizing inductor Lm1 and enters a second resonant mode. Preferably, the two LLC half-bridge series resonant converters of the present disclosure operate in the second region (i.e., fr1<fs<fr2).

In this case, as shown in FIG. 1, the first switch circuit 110 includes a first upper bridge switch Q1 and a first lower bridge switch Q2, the second switch circuit 120 includes a second upper bridge switch Q3 and a second lower bridge switch Q4, and diodes D1, D2, D3 and D4 and capacitors Coss1, Coss2, Coss3 and Coss4 are respectively body diodes and parasitic capacitors of the first upper bridge switch Q1, the first lower bridge switch Q2, the second upper bridge switch Q3 and the second lower bridge switch Q4. On the other hand, the first rectifier circuit 116 includes a first rectifier switch Q5 and a second rectifier switch Q6, the second rectifier circuit 126 includes a third rectifier switch Q7 and a fourth rectifier switch Q8, and diodes D5, D6, D7 and D8 are respectively body diodes of the first rectifier switch Q5, the second rectifier switch Q6, the third rectifier switch Q7 and the fourth rectifier switch Q8. In the following, the rectifier switches are presented as diodes, such as the diodes D5, D6, D7 and D8, and the conduction voltage-dropping and resistance effects are ignored.

Figure 2:
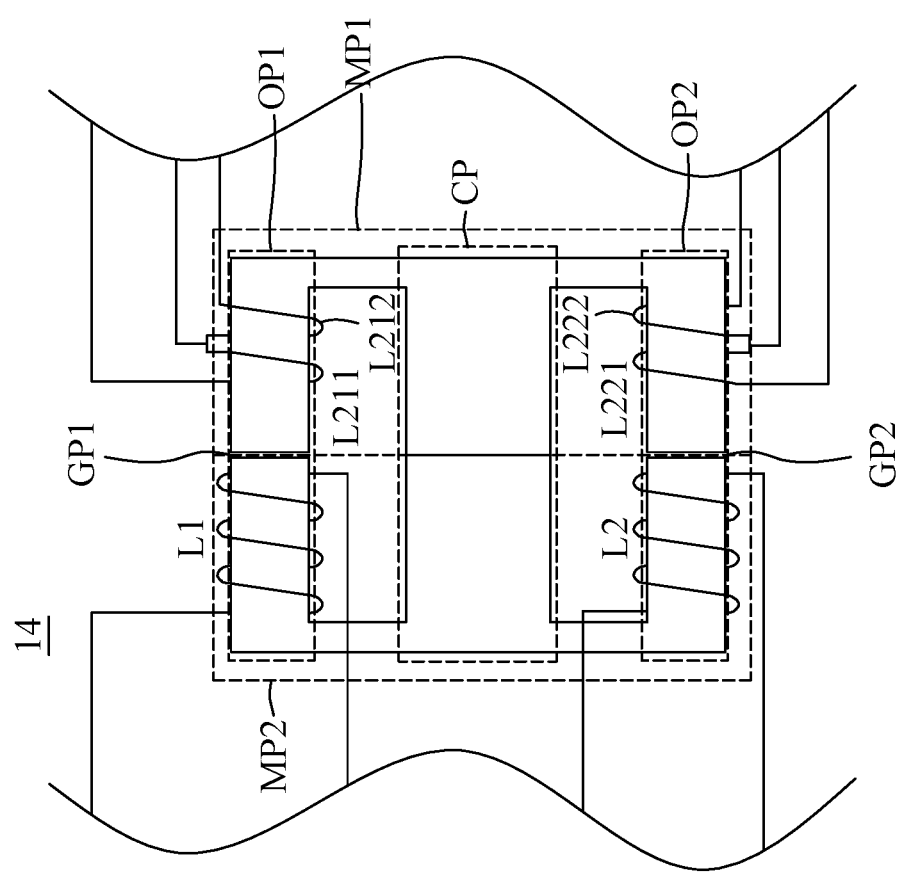
FIG. 2 is a schematic diagram of a magnetic core, a primary winding, and a secondary winding of an integrated transformer of an embodiment of the present disclosure.

Reference is now made to FIG. 2, which is a schematic diagram of a magnetic core, a primary winding, and a secondary winding of the integrated transformer of an embodiment of the present disclosure. As shown in FIG. 2, the magnetic core 14 has the first outer column OP1, a center column CP and the second outer column OP2. In order to prevent the first transformer 114 and the second transformer 124 from interfering with each other, the primary winding and the secondary winding of a center tap transformer are wound on the same magnetic column.

The first transformer 114 includes the first primary side winding L1 wound on the first outer column OP1 and the first secondary winding L21 wound on the second outer column OP2. The second transformer 124 includes the second primary side winding L2 wound on the outer column OP1 and the second secondary side winding L22 wound on the second outer side column OP2. The first lateral column OP1 and the second lateral column OP2 are divided into a first magnetic column portion MP1 and a second magnetic column portion MP2 through a first air gap GP1 and a second air gap GP2, respectively. The first primary side winding L1 is wound on the first outer column OP1 of the first magnetic column portion MP1, and the first secondary side winding L21 is wound on the second outer column OP2 of the first magnetic column portion MP1, the second primary winding L2 is wound on the first outer column OP1 of the second magnetic column portion MP2, and the second secondary side winding L22 is wound on the second outer column OP2 of the second magnetic column portion MP2.

The first secondary side winding L21 further includes a positive half-cycle winding L211 and a negative half-cycle winding L212, and the second secondary side winding L22 further includes a positive half cycle winding L221 and a negative half-cycle winding L222.

Figure 3:
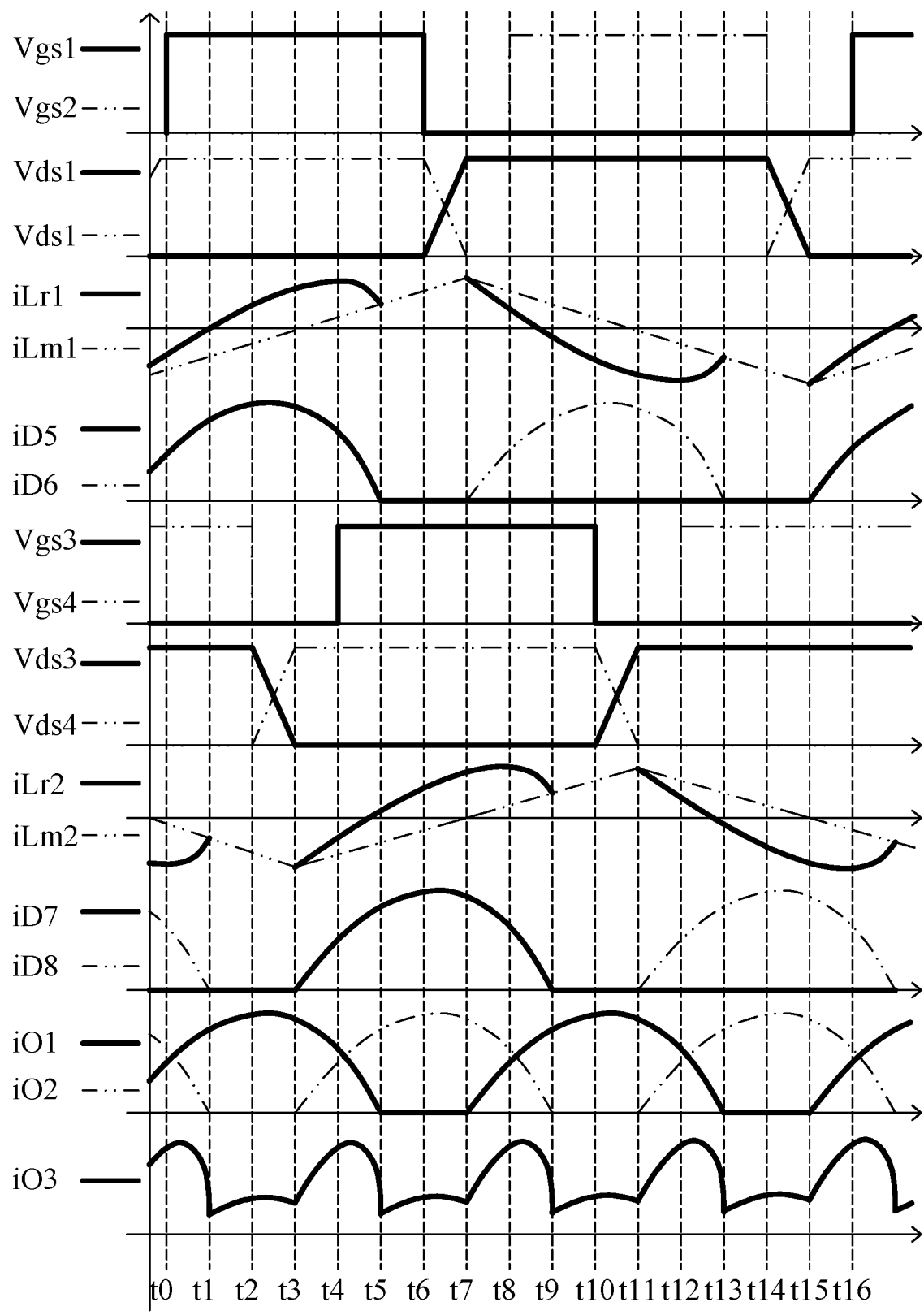
FIG. 3 is a timing chart of an interleaved LLC half-bridge series resonant converter of an embodiment of the present disclosure.

Reference is now made to FIG. 3 and FIGS. 4A to 4H. FIG. 3 is a timing chart of an interleaved LLC half-bridge series resonant converter of an embodiment of the present disclosure, and FIGS. 4A to 4H are schematic diagrams showing current paths of a first phase through an eighth phase of interleaved LLC half-bridge series resonant converter of an embodiment of the present disclosure. As shown in FIG. 3, actions in a cycle can be divided into 16 phases, of which the t0 to t8 phases and the t8 to t16 phases are pair-states. Therefore, only the t0-t8 phases are described hereinafter. For the sake of brevity, the synchronous rectifier switches on the secondary side are presented as diodes, and the conduction voltage dropping and resistance effect thereof are ignored. Since the synchronous rectifier switches on the secondary side have an extremely large output capacitance, the synchronous rectifier switches on the secondary side can be regarded as constant voltage sources. In addition, the rest of the components in the circuit are ideal without any losses, and the integrated transformer is replaced by a simple transformer model.

Phase 1 (t0-t1)

Figure 4A:
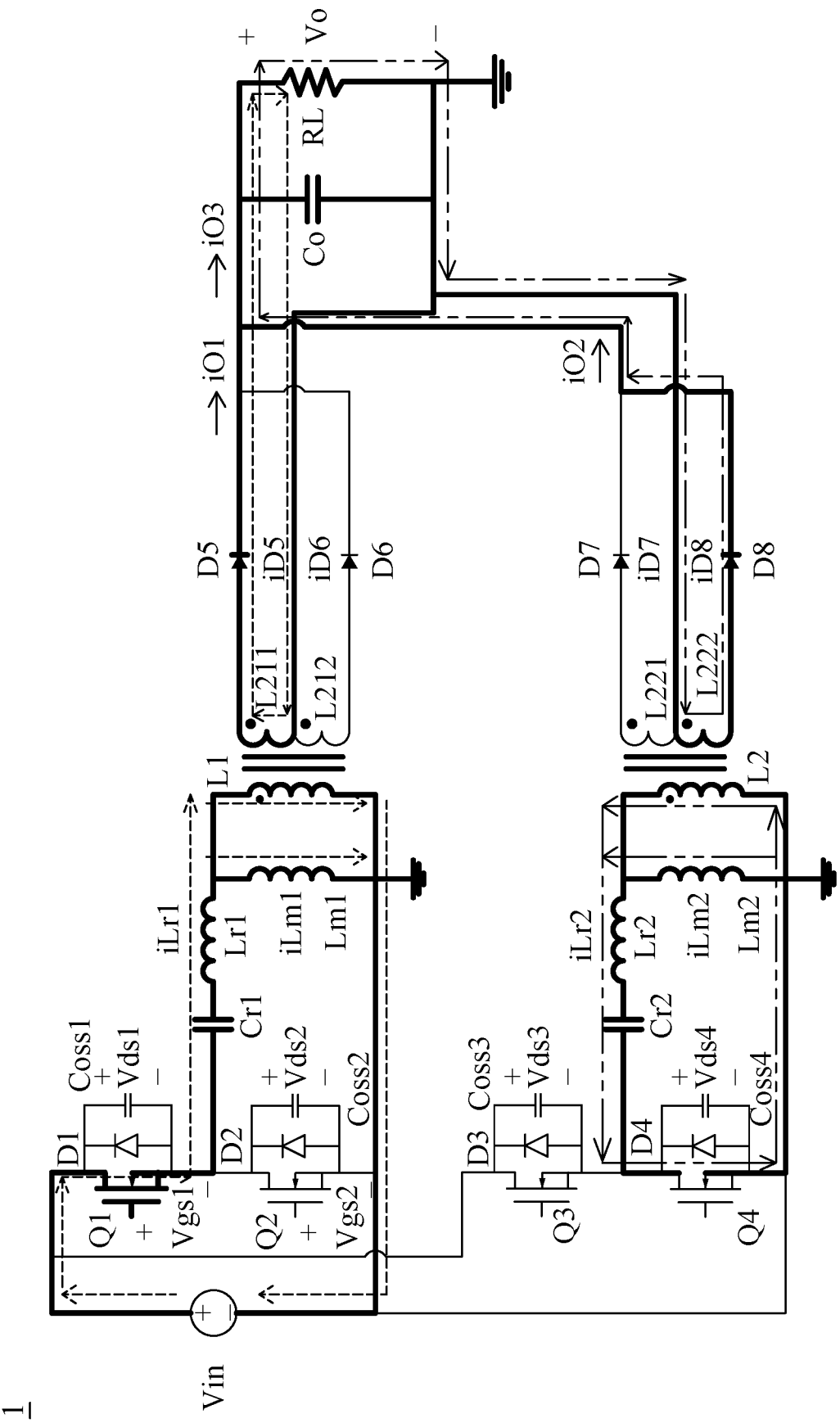
FIG. 4A to FIG. 4H are schematic diagrams showing current paths of a first phase through an eighth phase of interleaved LLC half-bridge series resonant converter of an embodiment of the present disclosure.

At time t=0, in the first transformer 11, the first upper bridge switch Q1 is zero-voltage switched to ON state, the first lower bridge switch Q2 maintains at OFF state. Since the current flowing through the first transformer 114 and the rectifier diode D5 on the primary side transfers energy to the output load RL, the voltage at the first magnetizing inductor Lm1 is clamped at nVo. Therefore, the magnetizing current iLm1 is linearly increased. At time t=0, in the second transformer 12, the second upper bridge switch Q4 is turned on, and the second lower bridge switch Q3 is turned off. Since the current flowing through the second transformer 124 and the rectifier diode D8 on the primary side transfers energy to the output load RL, the voltage at the second magnetizing inductor Lm2 voltage is clamped at −nVo. Therefore, the magnetizing current iLm2 is linearly decreased. FIG. 4A shows a current conduction path for Phase 1. Here, Vgs1, Vgs2, Vgs3, Vgs4 are gate voltages, Vds1, Vds2, Vds3, Vds4 are conduction voltages, iD5, iD6, ID7, ID8, iO1, iO2, iD3 are current, and Vo is an output voltage.

Phase 2 (t1-t2)

Figure 4B:
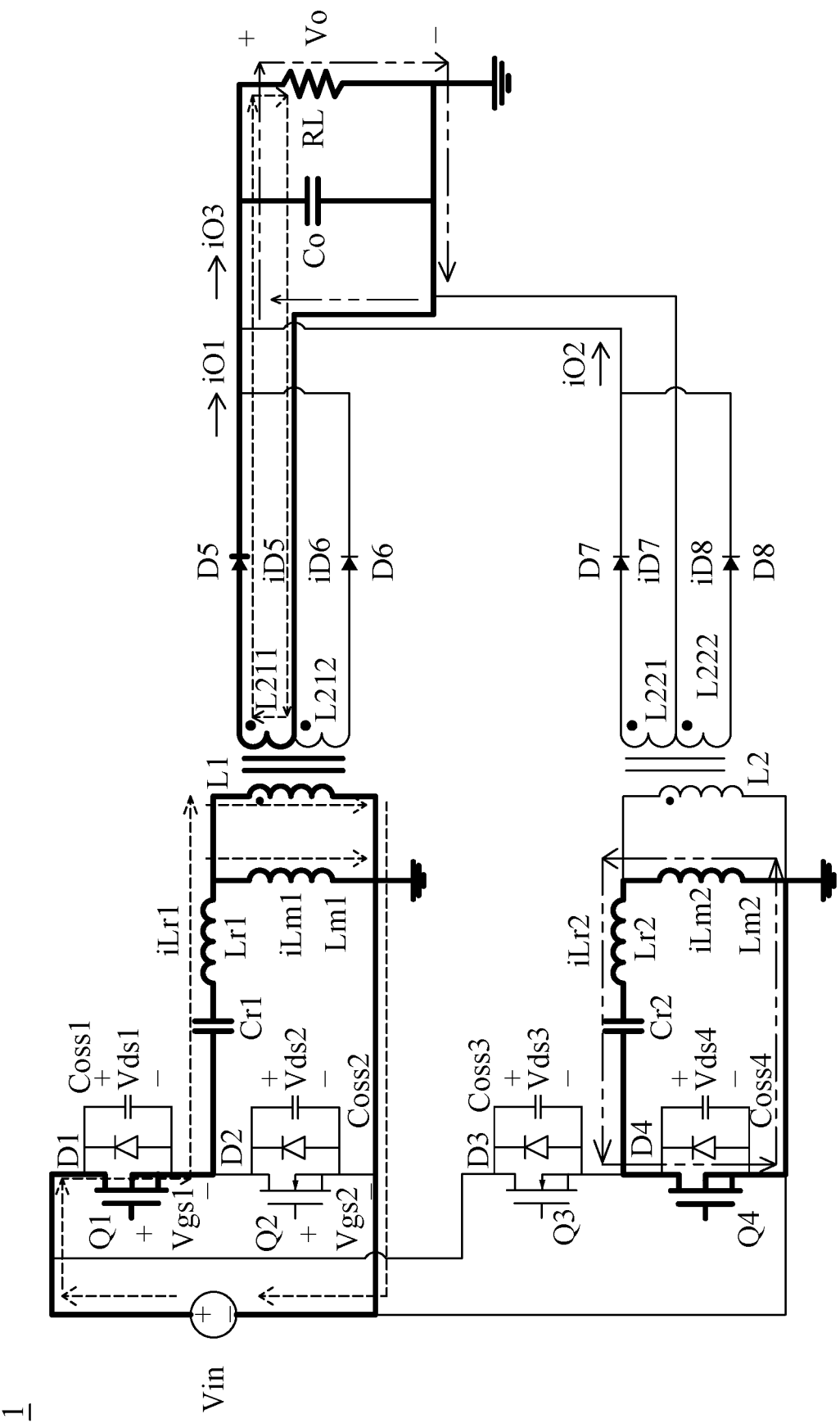

In the present phase, the first converter 11 maintains at a state being the same as Phase 1. At time t is t1, in the second converter 12, the resonant current iLr2 equals to the magnetizing current iLm2, and no current flows into the second transformer 124. The second transformer 124 is considered as being operated in decoupling state while stopping transmitting energy to the output end, and the rectifier diode D8 is zero-current cutoff, that is, the cross voltage on the second magnetizing inductor Lm2 is no longer clamped. Therefore, the second magnetizing inductor Lm2 is resonant with the second resonant inductor Lr2 and the second resonant capacitor Cr2 in this phase, while the output load energy is provided by the output filter capacitor Co. FIG. 4B shows a current conduction path for Phase 2.

Phase 3 (t2-t3)

Figure 4C:
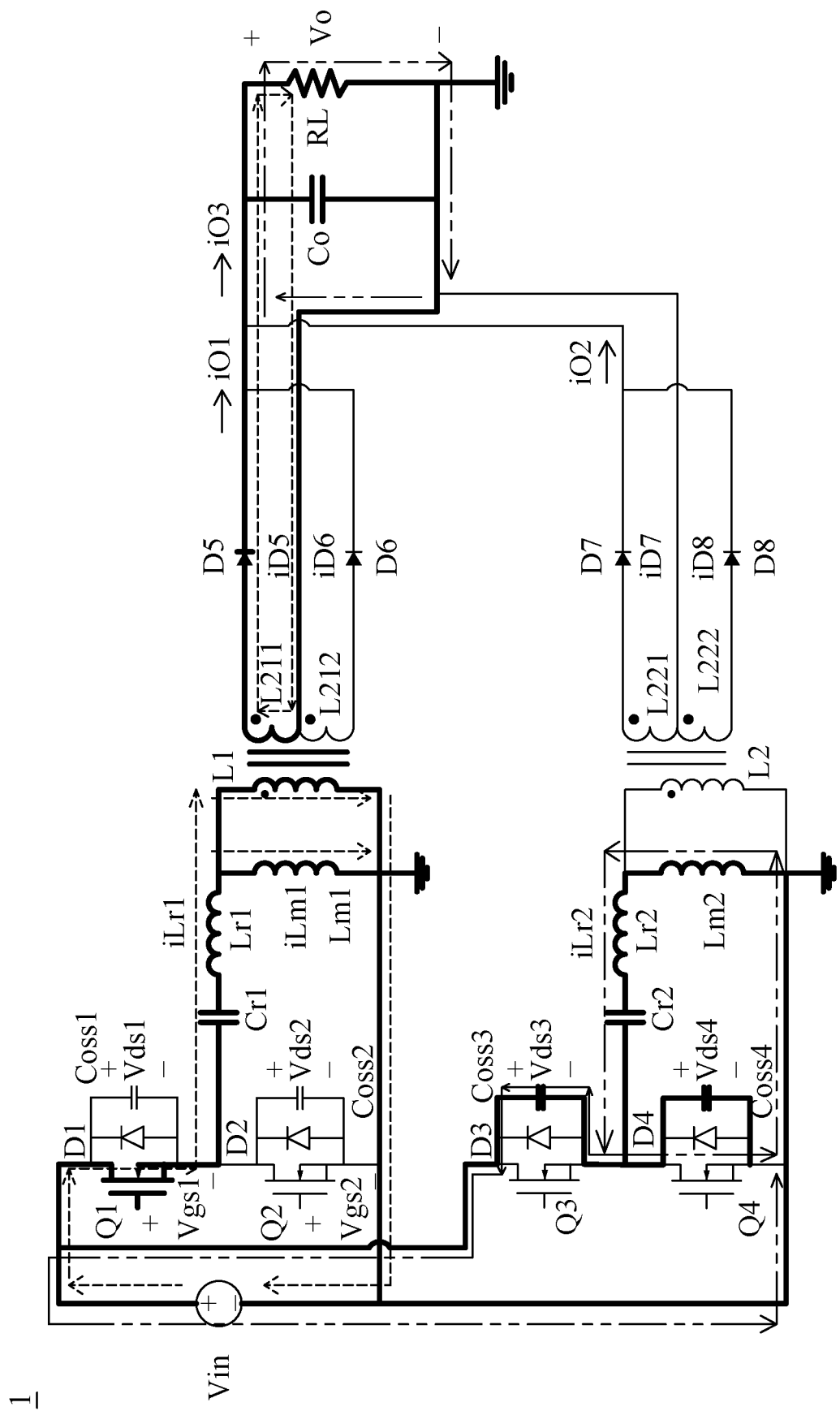

In the present phase, the first converter 11 still maintains at a state being the same as Phase 1. At time t is t2, in the second converter 12, the second lower bridge switch Q4 is turned off, while the resonant current iLr2 is still equal to the magnetizing current iLm2. Therefore, the second transformer 124 continues to maintain the decoupling state. Since the resonant current ILR2 maintains continuously flowing, the upper bridge parasitic capacitor Coss4 is charged to the input voltage Vin, while the lower bridge parasitic capacitor Coss3 is discharged to zero voltage. In the present phase, the resonant assemblies can be regarded as the upper and lower bridge parasitic capacitors Coss3, Coss4, the second resonant inductor Lr2, the second magnetizing inductor Lm2, and energy of the output load is still provided by the output filter capacitor Co. FIG. 4C shows a current conduction path for Phase 3.

Phase 4 (t3-t4)

Figure 4D:
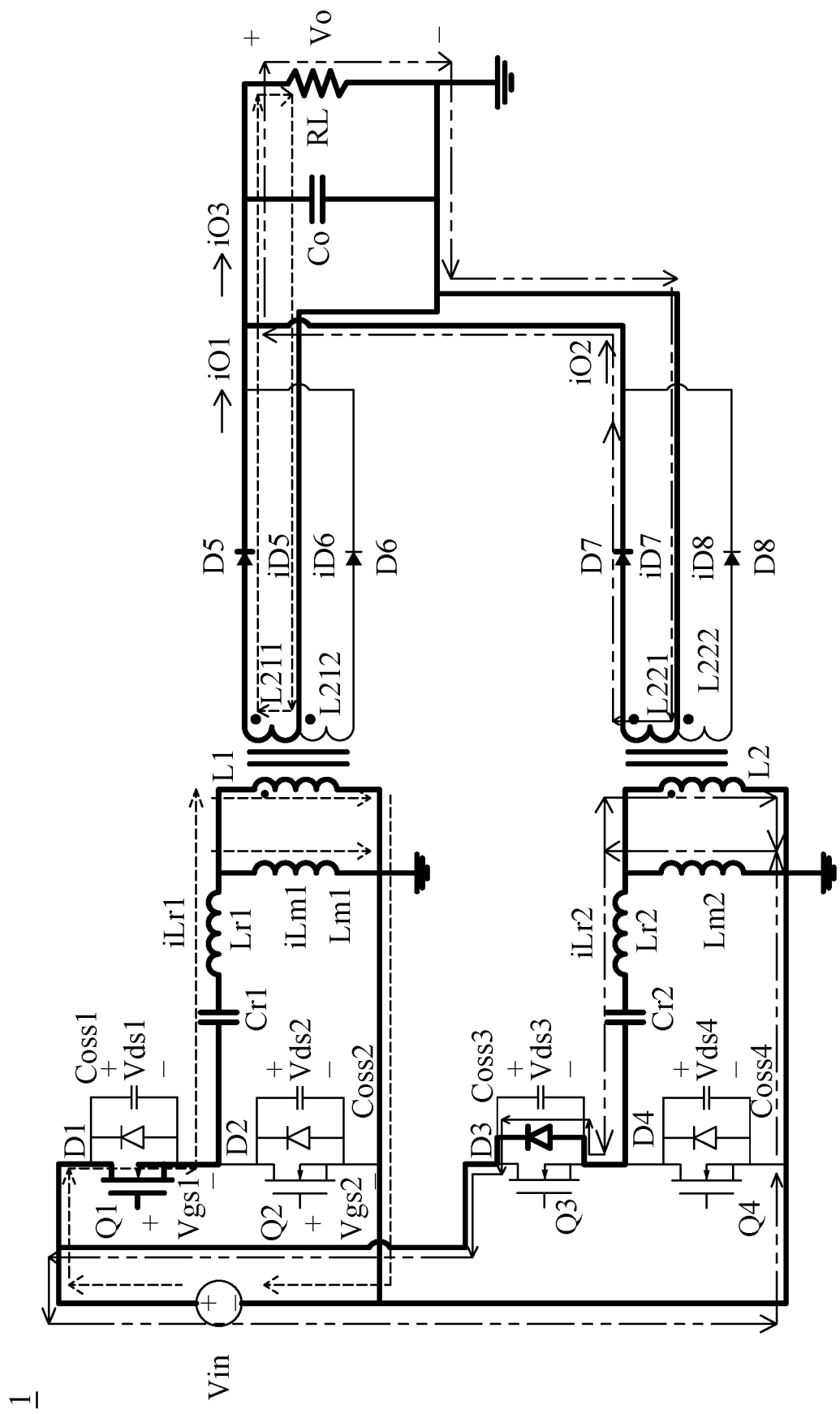

In the present phase, the first converter 11 still maintains at a state being the same as Phase 1. At time t is t1, in the second converter 12, the lower bridge parasitic capacitance Coss4 is charged to the input voltage Vin, and the upper bridge parasitic capacitance Coss3 has been discharged to zero voltage. At this time, the resonant current iLr2 will turn on the body diode D3 of the upper bridge switch Q3 so as to maintain continuously flowing. FIG. 4D shows a current conduction path for Phase 4.

Phase 5 (t4-t5)

Figure 4E:
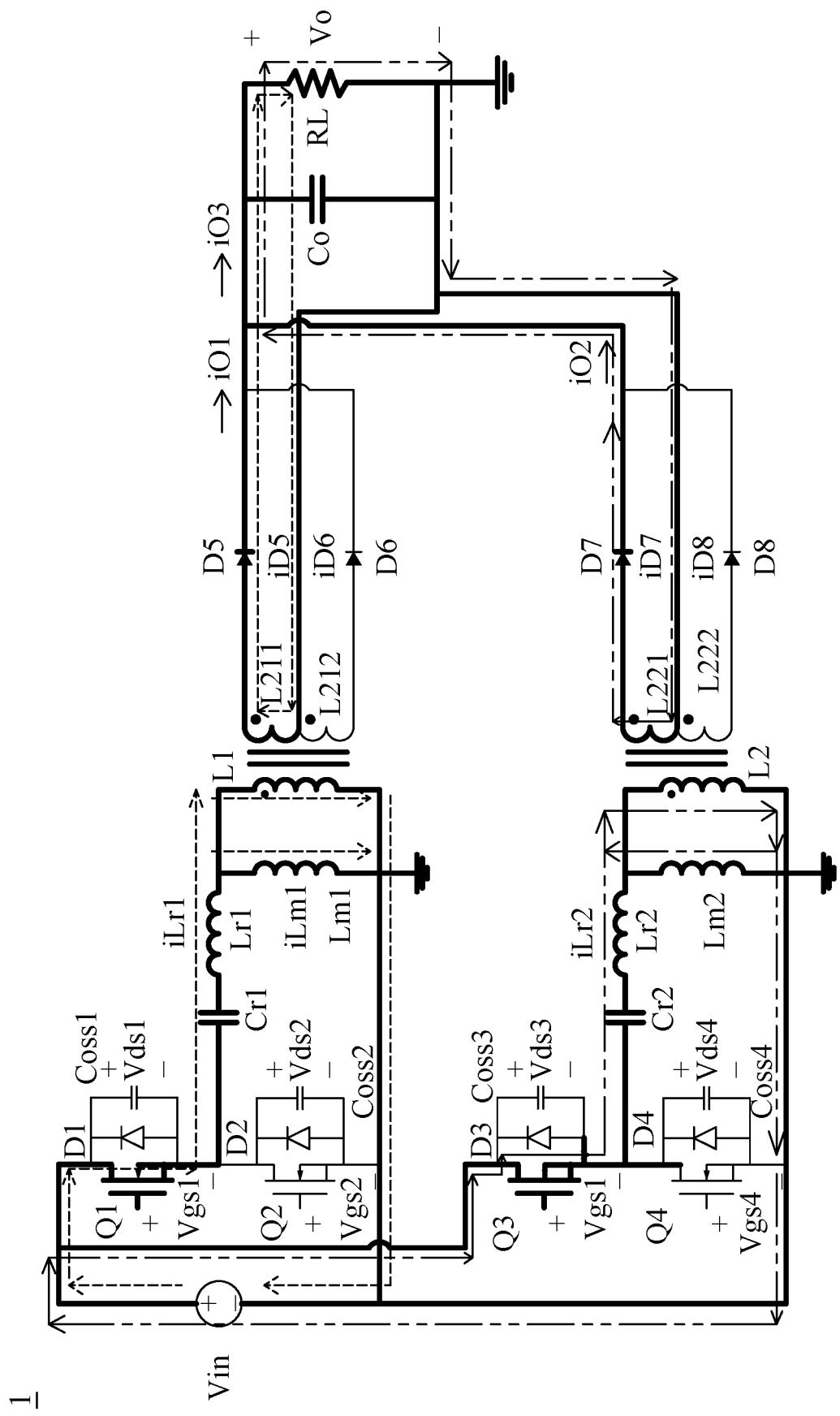

In the present phase, the first converter 11 still maintains at a state being the same as Phase 1. At time t is t4, in the second transformer 12, the upper bridge switch Q3 is turned on, and the resonant current iLr2 of the primary side flows through the second upper bridge switch Q3. Since the current flowing through the second transformer 124 and the rectifier diode D7 on the primary side transfers energy to the output load RL, the voltage at the second magnetizing inductor Lm2 voltage is clamped at nVo. Therefore, the magnetizing current iLm2 is linearly increased. FIG. 4E shows a current conduction path for Phase 5.

Phase 6 (t5-t6)

Figure 4F:
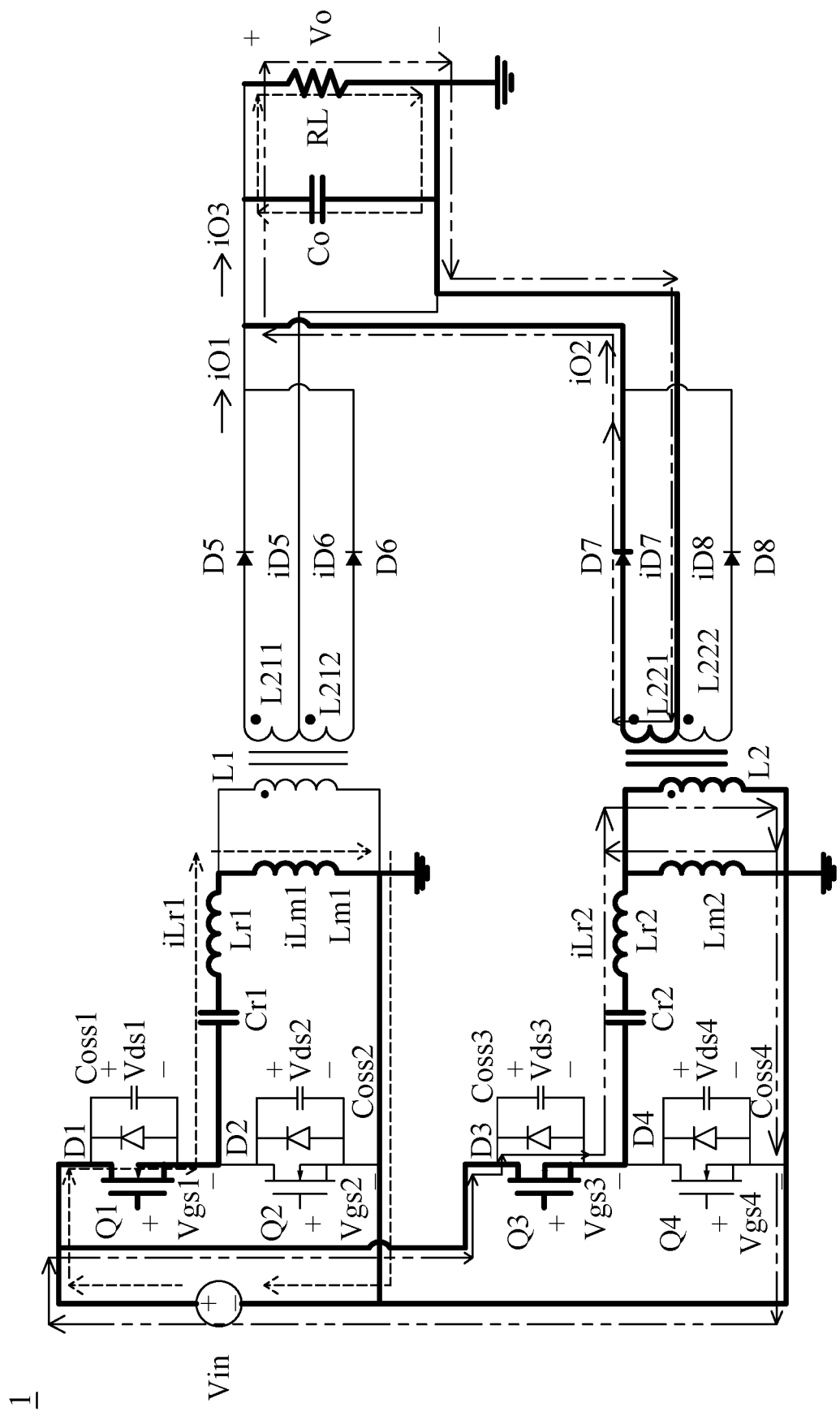

In the present phase, the second converter 12 maintains at a state being the same as Phase 5. At time t is t5, in the first converter 11, the resonant current iLr1 equals to the magnetizing current iLm1, and no current flows into the first transformer 114. The first transformer 114 is considered as being operated in a decoupling state while stopping transmitting energy to the output end, and the rectifier diode D5 is zero-current cutoff, that is, the cross voltage on the first magnetizing inductor Lm1 is no longer clamped. Therefore, the first magnetizing inductor Lm1 is resonant with the first resonant inductor Lr1 and the first resonant capacitor Cr1 in this phase, while the output load energy is provided by the output filter capacitor Co. FIG. 4F shows a current conduction path for Phase 6.

Phase 7 (t6-t7)

Figure 4G:
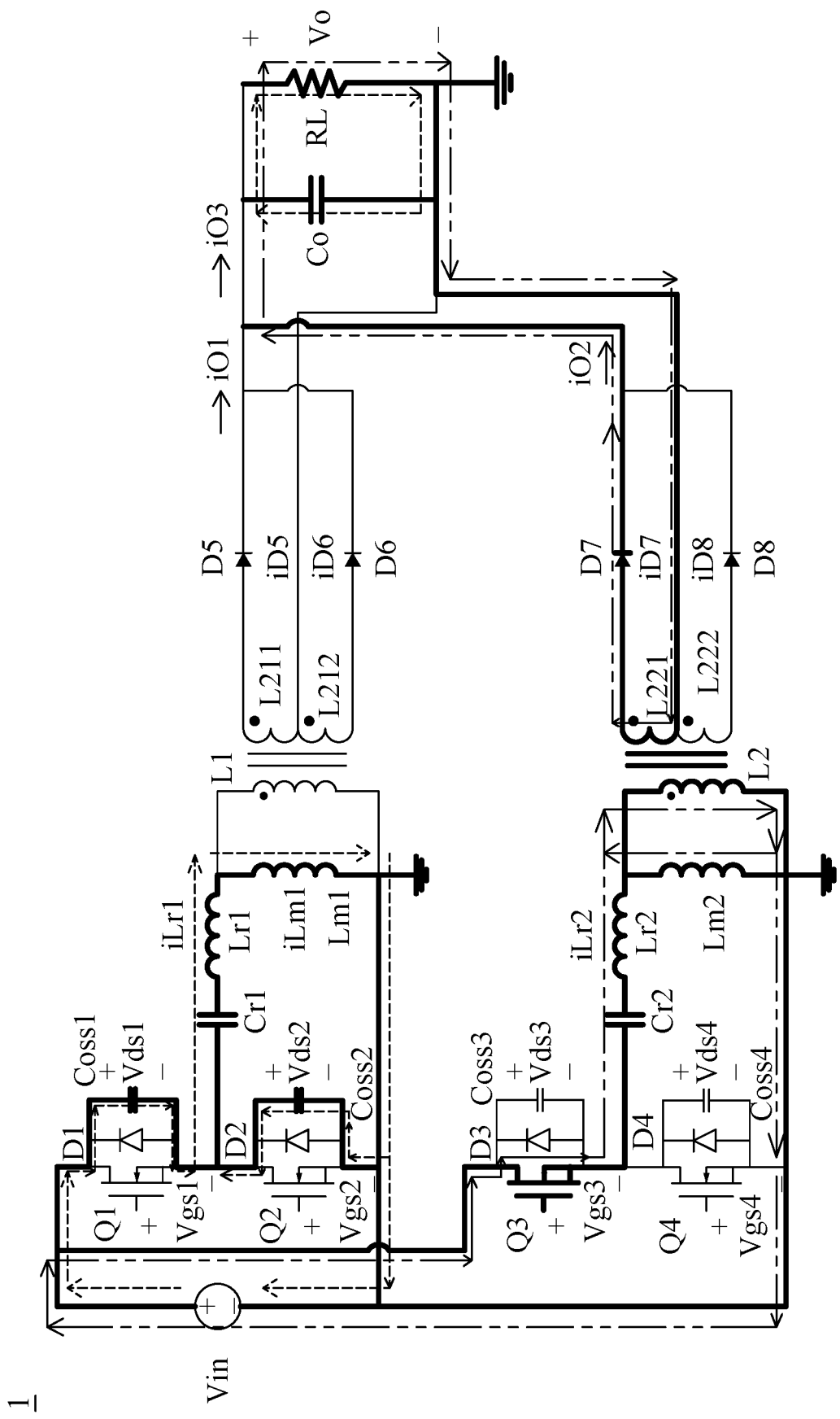

In the present phase, the second converter 12 still maintains at a state being the same as Phase 5. At time t is t6, in the first converter 11, the first upper bridge switch Q4 is turned off, while the resonant current iLr1 is still equal to the magnetizing current iLm1. Therefore, the first transformer 124 continues to maintain the decoupling state. Since the resonant current iLr1 maintains continuously flowing, the upper bridge parasitic capacitor Coss1 is charged to the input voltage Vin, while the lower bridge parasitic capacitor Coss2 is discharged to zero voltage. In the present phase, the resonant assemblies can be regarded as the upper and lower bridge parasitic capacitors Coss1, Coss2, the first resonant inductor Lr1, the first magnetizing inductor Lm1, and energy of the output load is still provided by the output filter capacitor Co. FIG. 4G shows a current conduction path for Phase 7.

Phase 8 (t7-t8)

Figure 4H:
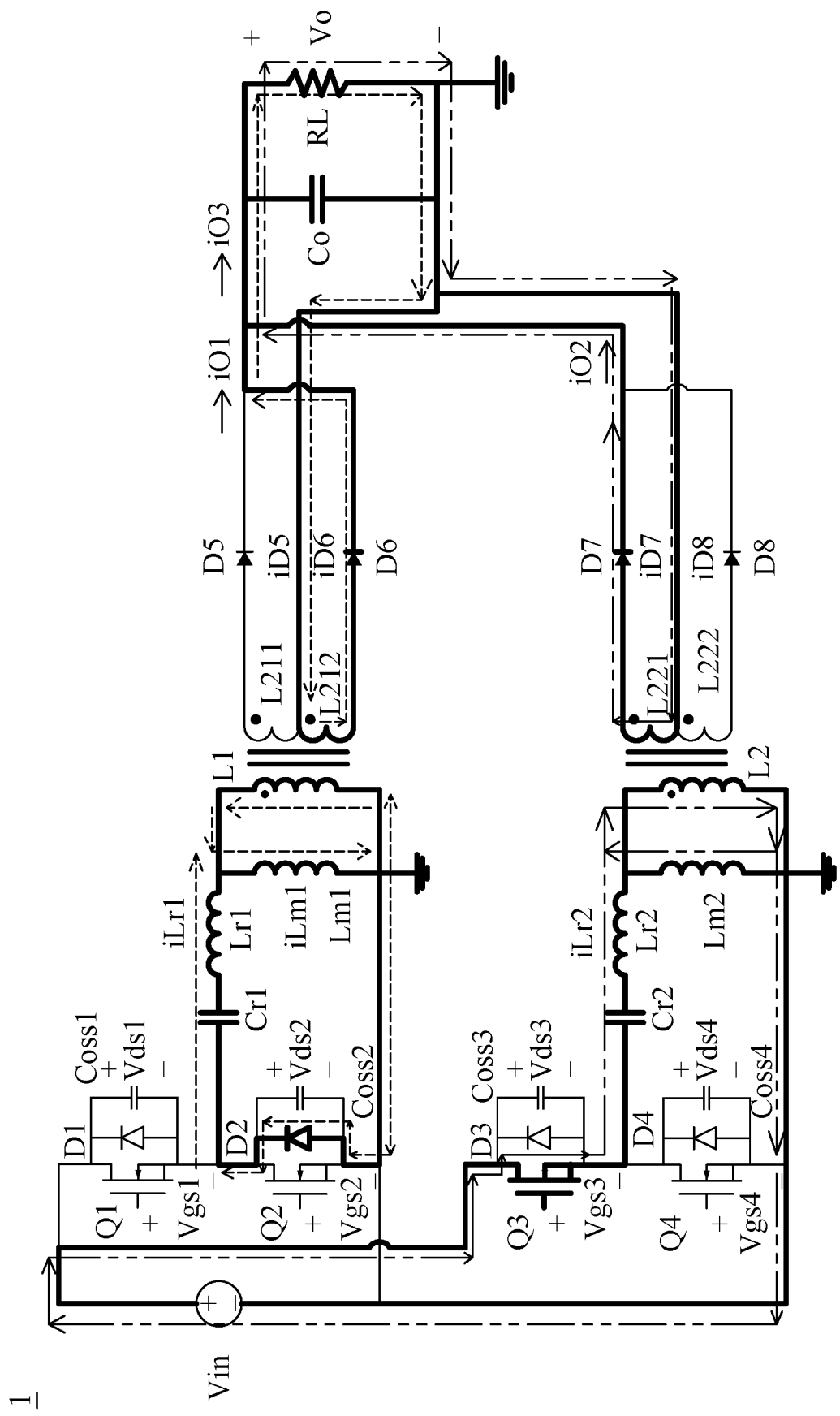

In the present phase, the second converter 12 still maintains at a state being the same as Phase 5. At time t is t7, in the second converter 11, the lower bridge parasitic capacitance Coss2 is charged to the input voltage Vin, and the upper bridge parasitic capacitance Coss1 has been discharged to zero voltage. At this time, the resonant current iLr2 will make the body diode D3 of the upper bridge switch Q3 being turned on so as to maintain continuously flowing. FIG. 4H shows a current conduction path for Phase 8.

The switch states of the first upper bridge switch Q1, the first lower bridge switch Q2, the second upper bridge switch Q3, the second bridge lower switch Q4, the first rectifier switch Q5, the second rectifier switch Q6, the third rectifier switch Q7 and the fourth rectifier switch Q8 are simplified as described in the following table 1. "o" represents ON state, and X represents OFF state. Here, Phase 1 to Phase 8 correspond to a first stage to a fourth stage, and the fifth stage to the eighth stage are dual states with respect to the first stage to the fourth stage.

TABLE 1

| Stage | Q1 | Q2 | Q3 | Q4 | Q5 | Q6 | Q7 | Q8 |
|---|---|---|---|---|---|---|---|---|
| 1st Stage (t0-t2) | O | X | X | O | O | X | X | O |
|  | O | X | X | O | O | X | X | X |
| 2nd Stage (t2-t4) | O | X | X | X | O | X | X | X |
|  | O | X | X | X | O | X | O | X |
| 3rd Stage (t4-t6) | O | X | O | X | O | X | O | X |
|  | O | X | O | X | X | X | O | X |
| 4th Stage (t6-t8) | X | X | O | X | X | X | O | X |
|  | X | X | O | X | X | O | O | X |
| 5th Stage (t8-t10) | X | O | O | X | X | O | O | X |
|  | X | O | O | X | X | O | X | X |
| 6th Stage (t10-t12) | X | O | X | X | X | O | X | X |
|  | X | O | X | X | X | O | X | O |
| 7th Stage (t12-t14) | X | O | X | O | X | O | X | O |
|  | X | O | X | O | X | X | X | O |
| 8th Stage (t14-t16) | X | X | X | O | X | X | X | O |
|  | X | X | X | O | O | X | X | O |

In the present embodiment, the interleaved LLC half-bridge series resonant converter 1 may further include a control circuit 15 for respectively controlling the first switch circuit 110, the second switch circuit 120, the first rectifier circuit 116, and the second rectifier circuit 126 to be switched between multiple switching states. For example, the first upper bridge switch Q1, the first lower bridge switch Q2, the second upper bridge switch Q3, the second lower bridge switch Q4, the first rectifier switch Q5, the second rectifier switch Q6, the third rectifier switch Q7, and the fourth rectifier switch Q8 are configured to operate in the manner of Table 1.

Figure 5A:
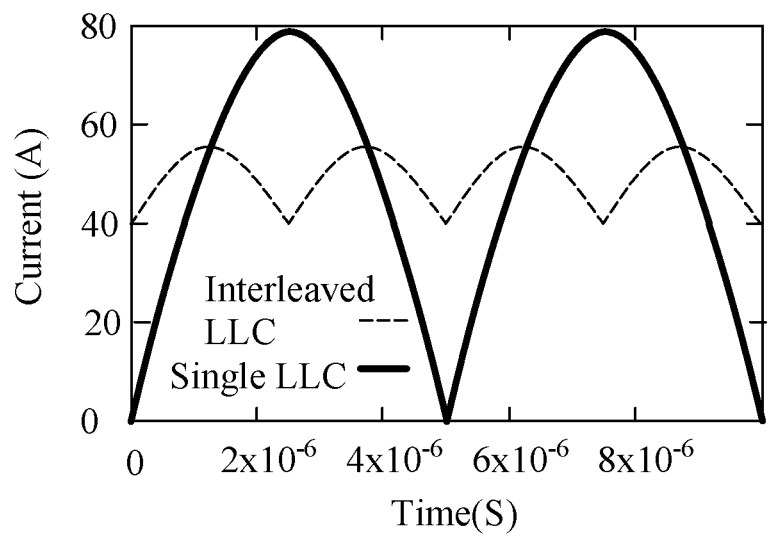
FIG. 5A is a graph showing a comparison of output current ripples of different structures according to an embodiment of the present disclosure.
Figure 5B:
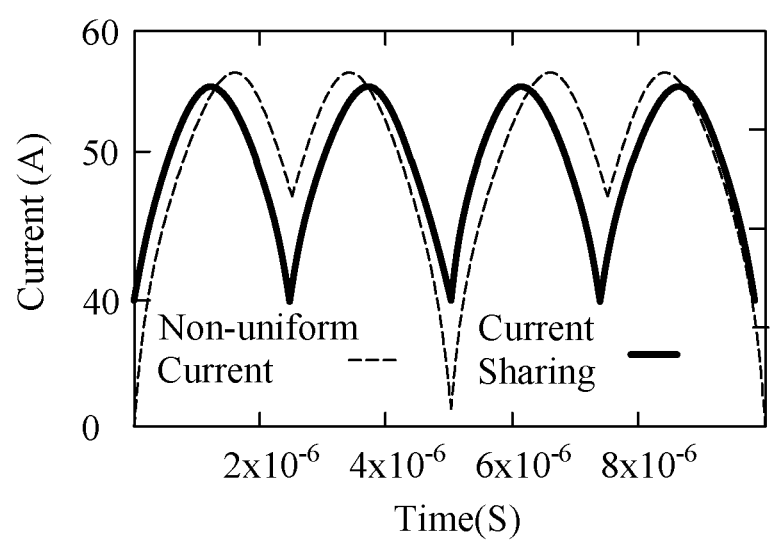
FIG. 5B is a graph showing a comparison of output current ripples of a current sharing group and a non-uniform current group according to an embodiment of the present disclosure.

Reference is now made to FIGS. 5A and 5B. FIG. 5A is a graph showing a comparison of output current ripples of different structures according to an embodiment of the present disclosure, and FIG. 5B is a graph showing a comparison of output current ripples of a current sharing group and a non-uniform current group according to an embodiment of the present disclosure. FIG. 5A shows a comparison of the output current ripples between the interleaved LLC half-bridge series resonant converter of the present disclosure and a single LLC half-bridge series resonant converter for an output current of 50 A. It can be seen that the interleaved LLC half-bridge series resonant converter has advantage in reducing the output current ripple.

In the conventional interleaved LLC half-bridge series resonant converter, two transformers are required so as to transmit the energy of each primary side, which means that two magnetic cores are required. However, due to the difference in the material of each magnetic core, the difference in the winding process and the difference in the air gap, some errors are existed in the magnetizing inductance and leakage inductance of the two transformers, so that the secondary side of each group of transformers transmits uneven energy, causing the countervail effect of the output current ripples to deteriorate. As shown in the drawings, the difference between the first transformer 114 and the second transformer 124 causes a non-uniform flow condition for the output current on the secondary side, and thus the output current ripples thereof become large.

For this reason, the present disclosure also provides an integrated transformer for the interleaved LLC half-bridge series resonant converter. In order to maximize the ability for suppressing the output current ripples for the interleaved LLC half-bridge series resonant converter, the integrated transformer of the present disclosure can greatly reduce the error of the magnetizing inductance and the leakage inductance, so that the current on the secondary side can be balanced, thereby maximizing the ability for suppressing the output current ripples.

In addition, the integrated transformer of the present disclosure can reduce the conduction loss of the synchronous rectifier switches on the secondary side when the converter is operated with low output voltage and high output current, and can be provided with the function for dividing the secondary side into multiple sets of current paths when using the magnetic core.

Figure 6:
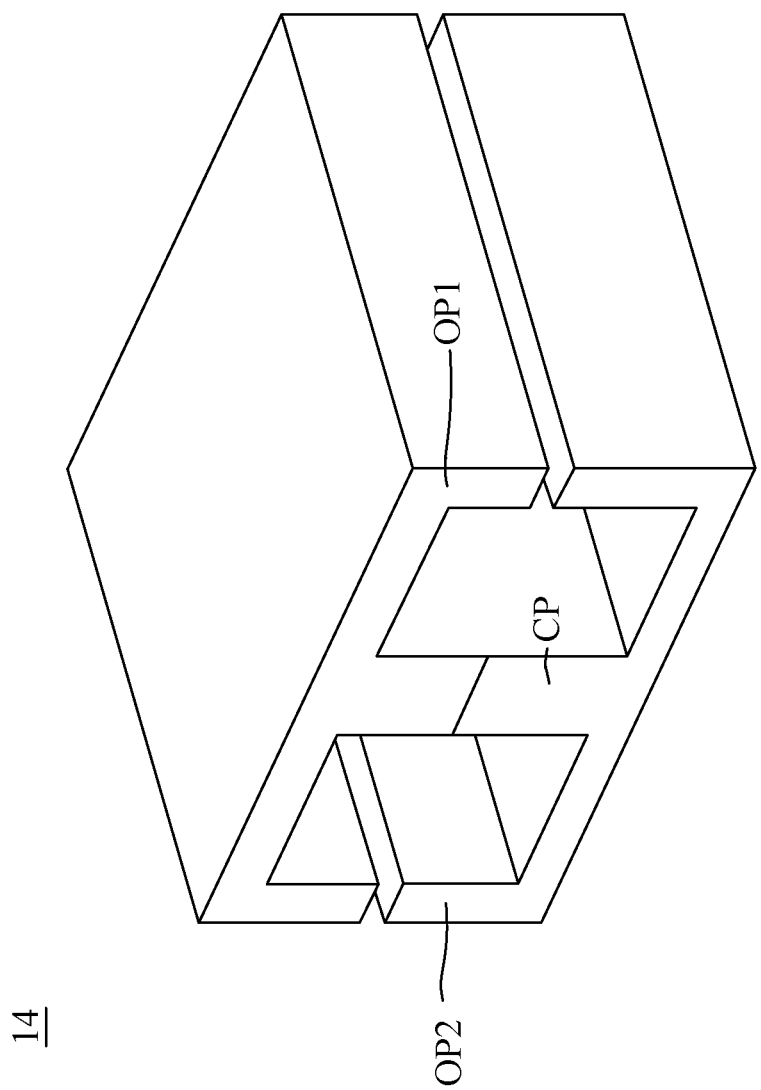
FIG. 6 is a schematic diagram of an integrated transformer core according to an embodiment of the present disclosure.

Reference is further made to FIG. 6, which is a schematic diagram of an integrated transformer core according to an embodiment of the present disclosure. As shown in the drawings, the magnetic core of the integrated transformer provided by the present disclosure will be divided into three columns. The magnetic core 14 contains a central column CP, a first outer column OP1 and a second outer column OP2, coils of the primary side and the secondary side will be individually wound on the two outer columns. Therefore, one outer column forms one transformer, such that the two transformers may be formed by one magnetic core, and the secondary side may also be divided into two sets of parallel paths. Another advantage of this structure is that the primary side winding and the secondary side winding of each of the first transformer 114 and the second transformer 124 are respectively wound on the same outer column, and part of magnetic flux can be canceled at the central column CP, thereby reducing the magnetic core loss.

Figure 7A:
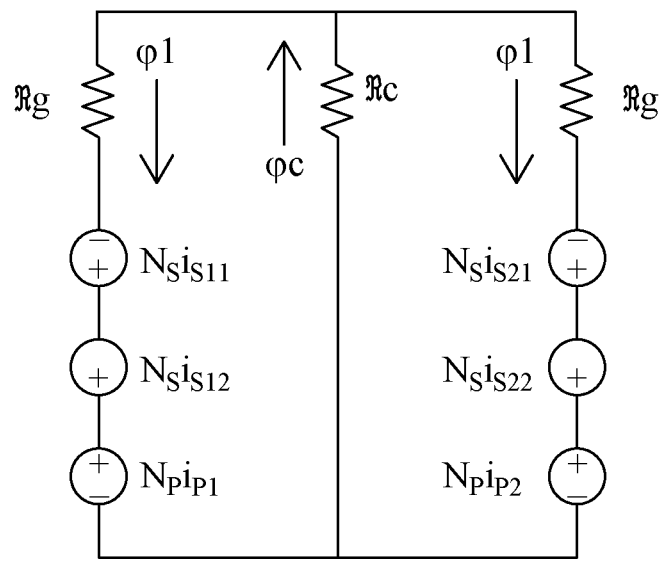
FIG. 7A and FIG. 7B are equivalent magnetic circuit diagrams of an integrated transformer of an embodiment of the present disclosure.
Figure 7B:
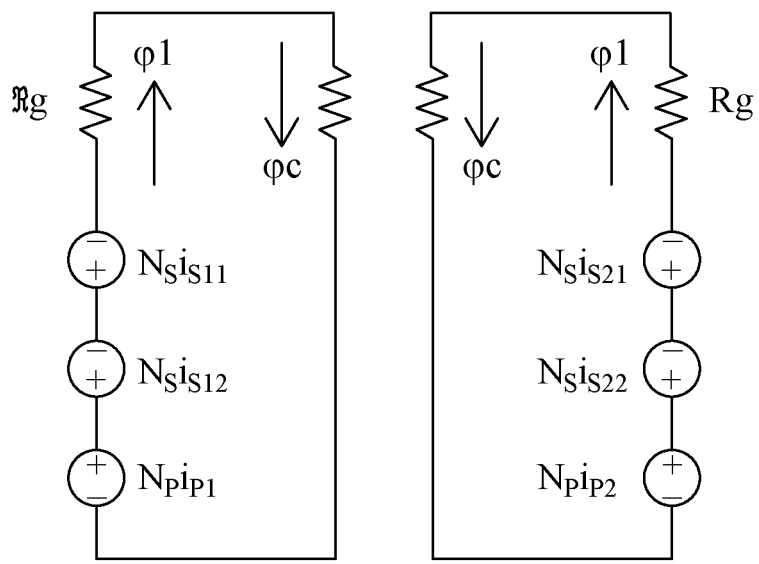
Figure 8:
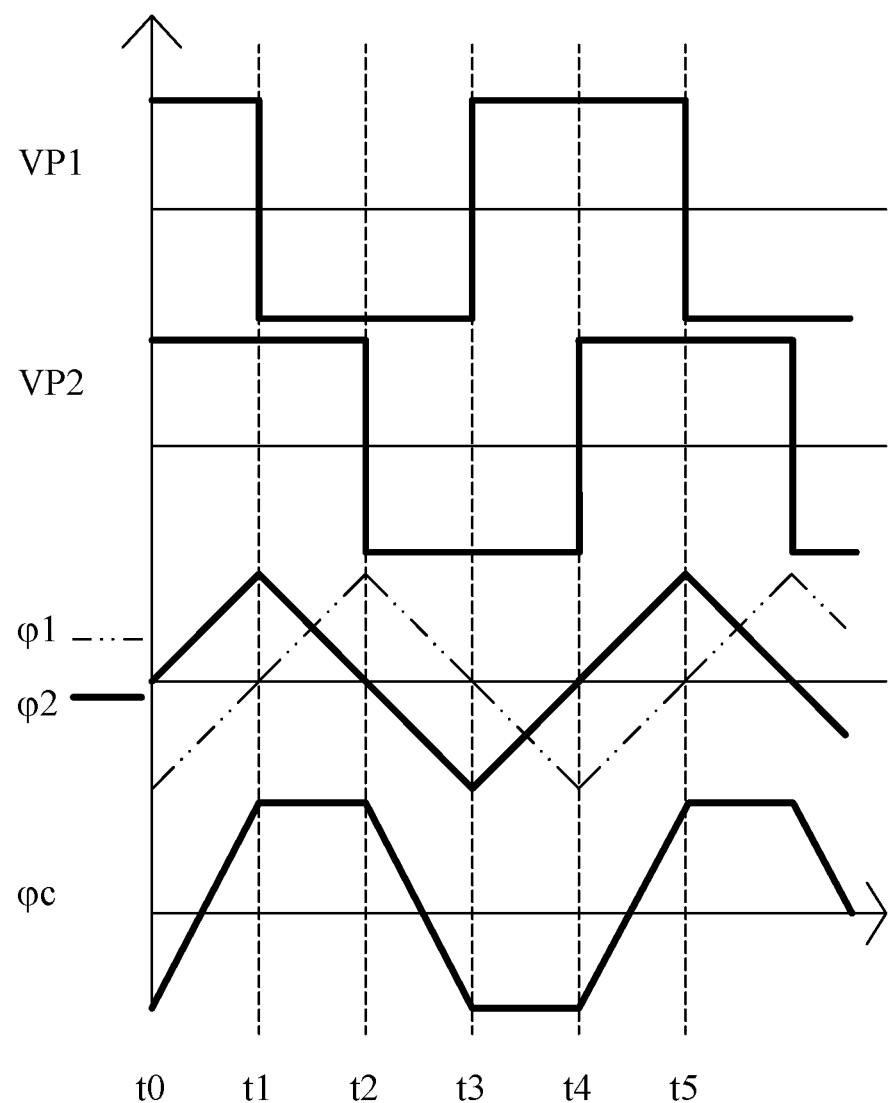
FIG. 8 is a timing chart showing operations of the magnetic flux of the magnetic core of the integrated transformer according to an embodiment of the present disclosure.

Reference is now made to FIGS. 7A and 7B, which are equivalent magnetic circuit diagrams of an integrated transformer of an embodiment of the present disclosure. In order to avoid the interference between the first transformer 114 and the second transformer 124, the primary winding and the secondary winding are wound on the same magnetic column in the same group of a center tap transformer, as shown in FIG. 2.

Since currents on the primary side of the transformer of the LLC half-bridge series resonant converter are AC currents, only the AC flux is analyzed. According to the structure and the winding type of each magnetic component of FIG. 2, the equivalent magnetic circuit diagram is shown in FIG. 7A. It should be noted that in the structure of the integrated transformer of the present disclosure, the central tap type is selected, and a way for winding is to replace the general way using the copper wire winding by using the flat coil layout on the PCB board, so that the coil difference of two transformers and the parameter error of the transformer are minimized.

In addition, in the structure of the LLC half-bridge series resonant converter, the ratio of the input voltage to the output voltage varies as a gain value G of the resonant tank and the numbers of primary side winding and secondary side winding of the integrated transformer, as shown in the following equation (1):

$$\frac{Vout}{\frac{1}{2}Vin} = G \times \frac{Ns}{Np} \qquad \text{Eq (1)}$$

Where Np and Ns are the numbers of the primary side winding and the secondary side winding, and different winding turn ratios allow the resonant converters to have different gain values G and to operate in different region. When the resonant converter operates in the second region, the gain of the resonant tank will be greater than 1. Therefore, the relationship between the winding turn ratio of the transformer and the input voltage Vin and the output voltage Vout is shown in the following equation (2):

$$\frac{Ns}{Np} \leq \frac{Vout}{\frac{1}{2}Vin} \qquad \text{Eq (2)}$$

Based on the above equation (2), the winding turn ratio of the transformer can be appropriately selected. For example, an example of circuit specifications is provided in Table 2 below.

TABLE 2

| Items | Specification |
| --- | --- |
| Input voltage (Vin) | 380 VDC |
| Output voltage (Vout) | 12 VDC |
| Output current (Iout) | 50 A |
| Maximum output power (Pout) | 600 W |
| Switching frequency (FS) | 100 kHz |
| Conversion efficiency (η) | 95% |

According to this table, Ns/Np≤12/190=1/15.833 can be obtained. Therefore, the number of primary side winding Np is selected to be 16 turns, and the number of secondary side winding Ns is selected to be 1 turn.

Here, Ni is magnetic potential, $\mathfrak{R}_g$, $\mathfrak{R}_c$ are magnetic resistance, and φ1, φc, and φ2 are flux directions. For the sake of simplicity, it is assumed that the magnetic material itself has a very small magnetic reluctance and can be neglected, and only reluctances of the air gaps are considered. Since the two transformers have the same structure, the number of primary side winding is 16 turns, and the number of secondary side winding is 1 turn. Therefore, NP1=NP2=NP, and NS11=NS12=NS21=NS22=NS For the structural symmetry, the equivalent magnetic reluctances of the air gaps GP1 and GP2 of the first outer column OP1 and the second outer column OP2 are both $\mathfrak{R}_g$, and the equivalent reluctance of the central column CP is $\mathfrak{R}_c$.

In FIG. 7A, a magnetic flux relationship can be obtained according to a view from the first outer column OP1 and the second outer column OP2, as shown in the following equations (3) and (4):

$$\varphi_1 = \frac{(\mathfrak{R}_g + \mathfrak{R}_c)[N_P i_{P1} - N_S(i_{S11} + i_{S12})]}{\mathfrak{R}_g(\mathfrak{R}_g + 2\mathfrak{R}_c)} \qquad \text{Eq (3)}$$

$$\varphi_2 = \frac{(\mathfrak{R}_g + \mathfrak{R}_c)[N_P i_{P2} - N_S(i_{S21} + i_{S22})]}{\mathfrak{R}_g(\mathfrak{R}_g + 2\mathfrak{R}_c)} \qquad \text{Eq (4)}$$

The representations of the magnetic flux φ1 and the magnetic flux φ2 respectively flowing into the central column can be the following equations (5) and (6):

$$\varphi_{1toC} = \varphi_1 \times \frac{\mathfrak{R}_g}{\mathfrak{R}_g + \mathfrak{R}_c}; \qquad \text{Eq (5)}$$

$$\varphi_{2toC} = \varphi_2 \times \frac{\mathfrak{R}_g}{\mathfrak{R}_g + \mathfrak{R}_c}; \qquad \text{Eq (6)}$$

Since no air gap is in the central column, $\mathfrak{R}_g \gg \mathfrak{R}_c$, and it can be found that the magnetic flux φ1 and magnetic flux φ2 of the two outer columns will only flow into the central column without coupling. Since the left and right sides have independent transformers, the magnetic circuit of FIG. 7A can be disassembled into two simplified equivalent magnetic paths as shown in FIG. 7B, and a new magnetic flux relationship can be obtained, as shown in the following equations (7) and (8):

$$\varphi_1 = \frac{N_P i_{P1} - N_S(i_{S11} + i_{S12})}{\mathfrak{R}_g + \mathfrak{R}_c}; \qquad \text{Eq (7)}$$

$$\varphi_2 = \frac{N_P i_{P2} - N_S(i_{S21} + i_{S22})}{\mathfrak{R}_g + \mathfrak{R}_c}; \qquad \text{Eq (8)}$$

The flow direction of the magnetic flux in each column and the equivalent magnetic circuit and variations for the magnetic flux in one cycle will be illustrated by using the structure of the magnetic core with the action interval diagrams thereof. Reference is now made to FIGS. 8, 9A to 9D, which are a timing chart and magnetic flux path diagrams showing operations of the magnetic flux of the magnetic core according to an embodiment of the present disclosure.

Phase 1 (t0-t1)

Figure 9A:
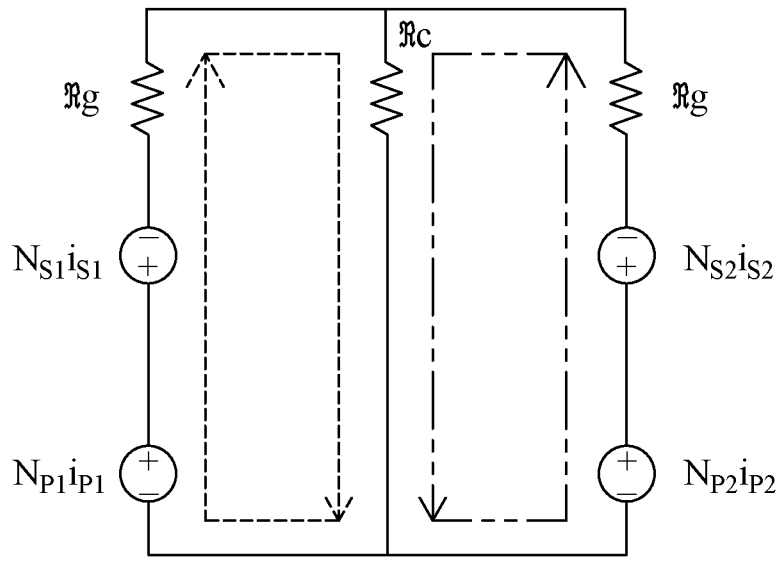
FIGS. 9A to 9D are magnetic flux path diagrams of the magnetic core of the integrated transformer according to embodiment of the present disclosure.

At time t is t0, the first side cross-voltage VP1 of the first transformer 114 is larger than 0, the first side cross-voltage VP2 of the second transformer 124 is larger than 0, and the first side cross-voltage VP1 and the first side cross-voltage VP2 respectively generate a magnetic flux φ1 and a magnetic flux φ2 along the corresponding directions in the first outer column OP1 and the second outer column OP2. The magnetic flux φ1 will rise linearly with the positive slope, and the magnetic flux φ2 will rise linearly with the negative slope at the moment, while a magnetic flux φc of the central column accumulated by the magnetic flux φ1 and the magnetic flux φ2 will rise with the positive slope. FIG. 9A shows a magnetic flux path and an equivalent magnetic circuit for Phase 1. It can be known from the equivalent magnetic circuit from FIG. 9A:

$$\varphi_1 = \frac{N_{P1} i_{P1} - N_{S1} i_{S1}}{\mathfrak{R}_g + \mathfrak{R}_c};$$

$$\varphi_2 = \frac{N_{P2} i_{P2} - N_{S2} i_{S2}}{\mathfrak{R}_g + \mathfrak{R}_c};$$

and φc = φ1 + φ2.

Figure 9B:
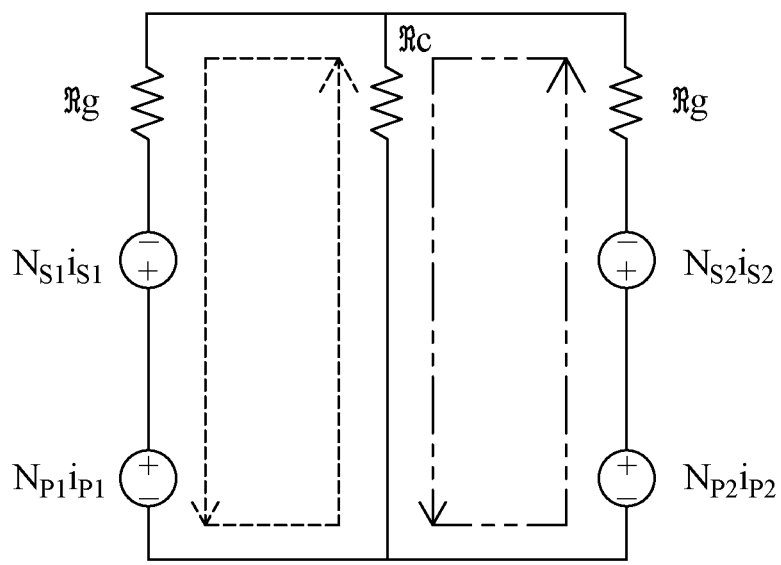

At time t is t1, the first side cross-voltage VP1 of the first transformer 114 is smaller than 0, and the first side cross-voltage VP2 of the second transformer 124 maintains at a state being the same as Phase 1. Therefore, the magnetic flux φ1 will decline linearly with the negative slope, and the magnetic flux φ2 will rise linearly with the negative slope while maintaining at the state of Phase 1, the magnetic flux φc of the central column accumulated by the declined magnetic flux φ1 and the raised magnetic flux φ2 at the moment will remain unchanged at a positive maximum. FIG. 9B shows a magnetic flux path and an equivalent magnetic circuit for Phase 2. It can be known from the equivalent magnetic circuit from FIG. 9B:

$$\varphi_1 = -\left(\frac{N_{P1}i_{P1} - N_{S1}i_{S1}}{\Re_g + \Re_C}\right);$$

$$\varphi_2 = \frac{N_{P2}i_{P2} - N_{S2}i_{S2}}{\Re_g + \Re_C};$$

and $\varphi c = \varphi 1 + \varphi 2$.

Phase 3 (t2-t3)

Figure 9C:
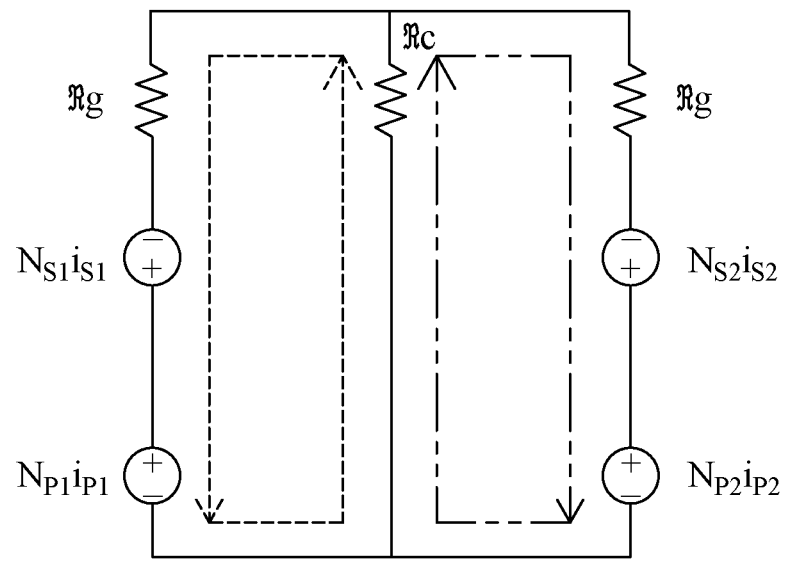

At time t is t2, the first side cross-voltage VP1 of the first transformer 114 maintains at a state being the same as Phase 2, and the first side cross-voltage VP2 of the second transformer 124 is smaller than 0. Therefore, the magnetic flux φ1 maintains declining linearly with the slope of Phase 2, and the magnetic flux φ2 will decline linearly with the negative slope. The magnetic flux φc of the central column accumulated by the magnetic flux φ1 and the magnetic flux φ2 will decline with a negative slope. FIG. 9C shows a magnetic flux path and an equivalent magnetic circuit for Phase 3. It can be known from the equivalent magnetic circuit from FIG. 9C:

$$\varphi_1 = -\left(\frac{N_{P1}i_{P1} - N_{S1}i_{S1}}{\Re_g + \Re_C}\right);$$

$$\varphi_2 = -\left(\frac{N_{P2}i_{P2} - N_{S2}i_{S2}}{\Re_g + \Re_C}\right);$$

and $\varphi c = \varphi 1 + \varphi 2$.

Phase 4 (t3-t4)

Figure 9D:
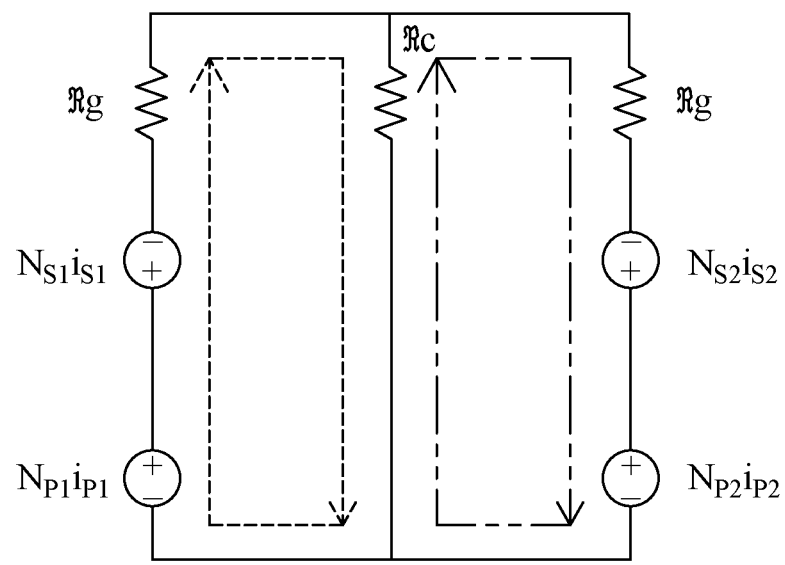

At time t is t3, the first side cross-voltage VP1 of the first transformer 114 is larger than 0, and the first side cross-voltage VP2 of the second transformer 124 maintains at a state being the same as Phase 3. Therefore, the magnetic flux φ1 will rise linearly with a positive slope, and the magnetic flux φ2 will maintain declining linearly with the slope of Phase 3. The magnetic flux φc of the central column accumulated by the raised magnetic flux φ1 and the declined magnetic flux φ2 at the moment will remain unchanged at a negative maximum. FIG. 9D shows a magnetic flux path and an equivalent magnetic circuit for Phase 4.

It can be known from the equivalent magnetic circuit from FIG. 9D:

$$\varphi_1 = \frac{N_{P1}i_{P1} - N_{S1}i_{S1}}{\Re_g + \Re_C};$$

$$\varphi_2 = -\left(\frac{N_{P2}i_{P2} - N_{S2}i_{S2}}{\Re_g + \Re_C}\right);$$

and $\varphi c = \varphi 1 + \varphi 2$.

Based on the above, in order to prevent the first transformer 114 and the second transformer 124 from coupling, the first air gap GP1 and the second air gap GP2 are respectively added to the first outer column OP1 and the second outer column OP2 for dividing into the first magnetic column portion MP1 and the second magnetic column portion MP2. Here, lengths of the first air gap GP1 and the second air gap GP2 depend on design values of the first magnetizing inductor Lm1 and the second magnetizing inductor Lm2, and soft-switching conditions in which the switch circuits on the primary side being zero-voltage-switched to ON state must be satisfied, and the design values are related to operation frequencies, dead-zone time and switching parasitic capacitance.

In detail, when the first converter 11 operates in LLC-SRC, the zero-voltage switching conditions are: in a fixed dead zone time, the magnetizing current iLm1 can smoothly discharge the parasitic capacitor Coss1 of the first upper bridge switch Q1 to 0 volts, and charge the parasitic capacitor Coss2 of the first lower bridge switch Q2 to the input voltage Vin. Here, a curve diagram of the parasitic capacitance corresponding to the voltage across the switch can be obtained according to the component manual provided by the power switch manufacturer, and the total charge for the parasitic capacitance charged from 0V to the input voltage Vin, for example, 380V shown in Table 2, can be obtained by using the curve diagram.

In this embodiment, the total charge of the parasitic capacitance Coss1 of the first upper bridge switch Q1 charged from 0 V to 380 V can be, for example, 124585 pC, and the magnetizing inductance values are obtained by using the following equations (9) and (10):

$$Q\text{total} = Coss \times Vds = iLm \times td; \qquad \text{Eq(9)}$$

$$Lm \leq \frac{td}{16 \times Coss \times fs} = 381.3 \ \mu H; \qquad \text{Eq (10)}$$

By combining the results of equations (9) and (10), the inductance value of the first magnetizing inductor Lm1 is selected to be 381.3 pH After obtaining the magnitude of the magnetizing inductance value from the circuit specification, the value of the magnetizing inductance depends on the size specification, the number of coils, the length of the air gap, the magnetic permeability of the magnetic core, and the like. The magnitudes of the respective magnetic reluctances can be obtained first, and then the first magnetizing inductor Lm1 and the second magnetizing inductor Lm2 are derived. In order to obtain a more accurate relationship between the magnetizing inductance value and the magnetic reluctance to facilitate following design procedures, the magnetic reluctance of the magnet material will be taken into account. First of all, the magnetic reluctance must be divided into several blocks, as shown in FIG. 11, which is a schematic diagram showing magnetic reluctance blocks of the integrated transformer of an embodiment of the present disclosure.

Figure 11:
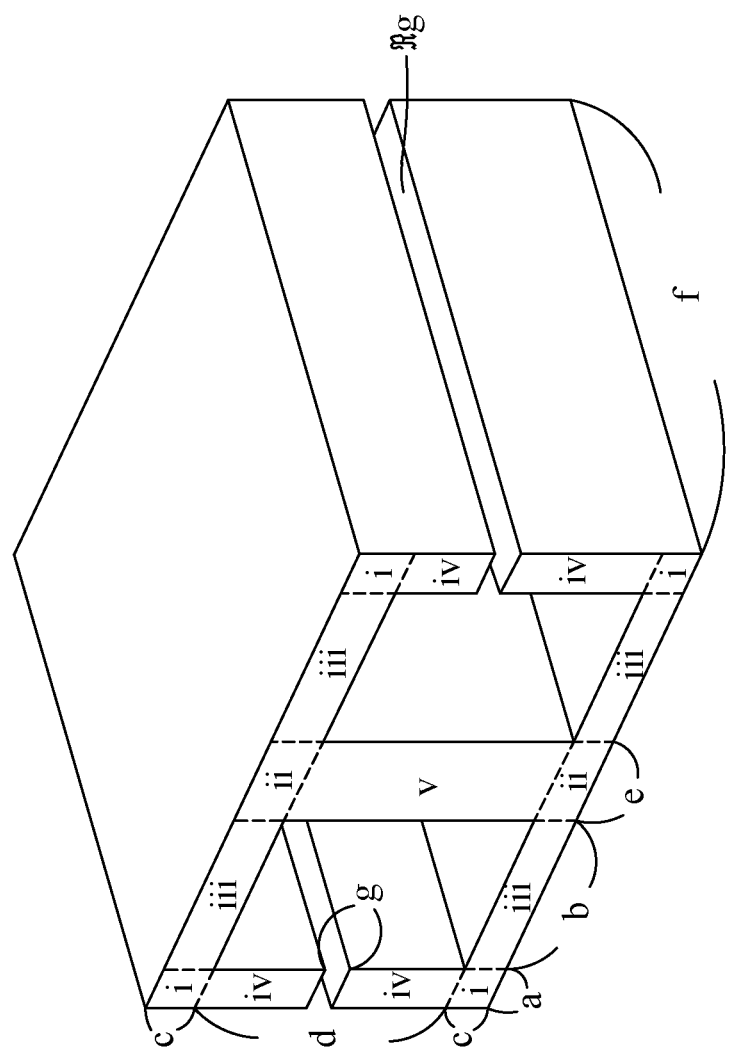
FIG. 11 is a schematic diagram showing magnetic reluctance blocks of an integrated transformer of an embodiment of the present disclosure.

As shown in FIG. 11, the specifications of the magnetic core 14 are shown as the lengths a to f in the drawings, and the equivalent magnetic reluctances of the magnetic reluctance blocks i to v can be arranged as shown in Table 3 below:

TABLE 3

| Magnetic reluctance block | Magnetic path length (le) | Magnetic path area (Ae) |
|---|---|---|
| i | $\frac{\pi}{8}(a+c)$ | $\frac{f(a+c)}{2}$ |
| ii | $\frac{\pi}{8}(e+c)$ | $\frac{f(e+c)}{2}$ |

TABLE 3-continued

| Magnetic reluctance block | Magnetic path length (le) | Magnetic path area (Ae) |
|---|---|---|
| iii | b | c × f |
| iv | d | a × f |
| v | d − g | e × f |

Therefore, according to table 3 above, the relationship between magnetizing inductance and magnetic reluctance can be obtained as follows:

$$L_m = \frac{N_P^2}{2 \times (\mathfrak{R}_i + \mathfrak{R}_{ii} + \mathfrak{R}_{iii}) + \mathfrak{R}_{iv} + \mathfrak{R}_v + \mathfrak{R}_g};$$

$$L_m = \frac{N_P^2}{2 \times \left(\frac{l_i}{\mu_0 \mu_r A_i} + \frac{l_{ii}}{\mu_0 \mu_r A_{ii}} + \frac{l_{iii}}{\mu_0 \mu_r A_{iii}}\right) + \frac{l_{iv}}{\mu_0 \mu_r A_{iv}} + \frac{l_v}{\mu_0 \mu_r A_v} + \frac{l_{GAP}}{\mu_0 A_g}};$$

Figure 10:
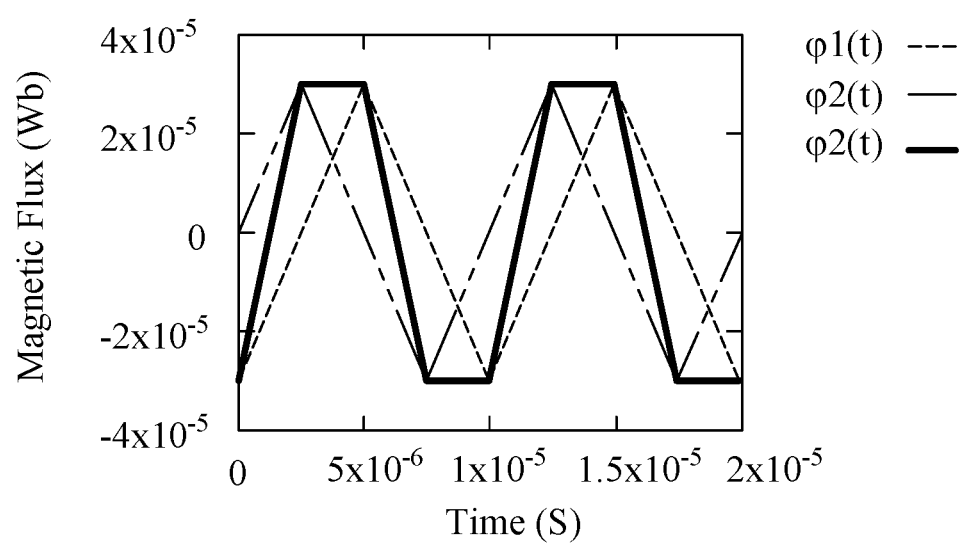
FIG. 10 is a graph showing a comparison for magnetic flux of each of columns of the magnetic core of an integrated transformer of an embodiment of the present disclosure.

It can be seen that the lengths g of the first air gap GP1 and the second air gap GP2 are specially designed for the inductance values required by the circuit specifications, and the magnetic flux φ1 and the magnetic flux φ2 will only flow into the center column OP1 through the arrangement of the first air gap GP1 and the second air gap GP2. However, the magnetic flux φ1 and the magnetic flux φ2 have the advantage of offsetting each other due to the phase difference, so that the maximum value of the magnetic flux φc of the center column OP1 does not become large. Reference is now made to FIG. 10, which is a graph showing a comparison for magnetic flux of each of columns of the magnetic core of the integrated transformer of an embodiment of the present disclosure. Here, φ1 and φ2 are magnetic flux of the two outer column, φc is the magnetic flux of the central column, and the units are WB for the above magnetic flux. From FIG. 10, it can be known that it is feasible to integrate two conventional transformers into one magnetic core.

One of the advantages of the present disclosure is that the interleaved LLC half-bridge series resonant converter having an integrated transformer provided by the present disclosure can reduce output current ripple and improve efficiency by utilizing two series-coupled LLC-SRCs combined with a mechanism in that 90° of phase shift is provided.

One of the advantages of the present disclosure is that the interleaved LLC half-bridge series resonant converter having an integrated transformer provided by the present disclosure can reduce the error of two transformers to achieve current-sharing for the secondary currents by utilizing a technique in that two transformers being integrated into one magnetic core, and by replacing the conventional winding frame-wound transformer with the plate transformer.

The above disclosure is only a preferred embodiment of the present disclosure, and is not intended to limit the scope of the present disclosure. Therefore, any equivalent technical changes made by using the present specification and the contents of the drawings are included in the scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interleaved LLC half-bridge series resonant converter having an integrated transformer, comprising:
   a power supply;
   a magnetic core, having a first outer column, a center column and a second outer column;
   a first converter, including:
      a first switch circuit, configured to control a first input voltage and a first input current from the power supply;
      a first resonant tank coupled to the first switch circuit, including a first resonant inductor, a first resonant capacitor and a first magnetizing inductor;
      a first transformer coupled to the first resonant tank, including:
         a first primary winding wound on the first outer column; and
         a first secondary winding wound on the second outer column; and
      a first rectifier circuit configured to receive and rectify an output voltage and an output current of the first transformer;
   a second converter, including:
      a second switch circuit, configured to control a second input voltage and a second input current from the power supply;
      a second resonant tank coupled to the second switch circuit, including a second resonant inductor, a second resonant capacitor and a second magnetizing inductor;
      a second transformer coupled to the second resonant tank, including:
         a second primary winding wound on the first outer column; and
         a second secondary winding wound on the second outer column; and
      a second rectifier circuit configured to receive and rectify an output voltage and an output current of the second transformer; and
   an output load circuit respectively coupled to the first rectifier circuit and the second rectifier circuit, having an output capacitor and a load,
   wherein a ratio of numbers of coils of the first primary winding to the first secondary winding is determined based on a first gain value of the first resonant tank and a ratio of the first input voltage to an output voltage of the output load circuit, a ratio of numbers of coils of the second primary winding to the second secondary winding is determined based on a second gain value of the second resonant tank and a ratio of the second input voltage to the output voltage of the output load circuit, and the first gain value and the second gain value are approximately 1.

2. The interleaved LLC half-bridge series resonant converter according to claim 1, wherein the first switch circuit includes a first upper bridge switch and a first lower bridge switch, the second switching circuit includes a second upper bridge switch and a second lower bridge switch, the first rectifier circuit includes a first rectifier switch and a second rectifier switch, and the second rectifier circuit includes a third rectifier switch and a four rectifier switch.

3. The interleaved LLC half-bridge series resonant converter according to claim 2, further comprising a control circuit configured to respectively control the first switching circuit, the second switching circuit, the first rectifier circuit and the second rectifier circuit to be switched between multiple switching states.

4. The interleaved LLC half-bridge series resonant converter according to claim 3, wherein in a first phase, the first upper bridge switch is turned on, the first lower bridge switch is turned off, the second upper bridge switch is turned off, and the second lower bridge switch is turned on;
in a second phase after the first phase, the second lower bridge switch is turned off;
in the third phase after the second phase, the second upper bridge switch is turned on; and
in a fourth phase after the third phase, the first upper bridge switch is turned off.

5. The interleaved LLC half-bridge series resonant converter according to claim 4, wherein in the first phase, the first rectifier switch is turned on, the second rectifier switch is turned off, the third rectifier switch is turned off, and the fourth rectifier switch is switched from ON state to OFF state;
in the second phase after the first phase, the third rectifier switch is switched from ON state to OFF state;
in the third phase after the second phase, the first rectifier switch is switched from ON state to OFF state; and
in the fourth phase after the third phase, the second rectifier switch is switched from OFF state to ON state.

6. The interleaved LLC half-bridge series resonant converter according to claim 4, wherein in a fifth phase, a sixth phase, a seventh phase and an eighth phase after the fourth phase, switching states of the first rectifier circuit and the second rectifier circuit are opposite to those in the first phase, the second phase, the third phase and the fourth phase, respectively, in the fifth phase, the sixth phase and the seventh phase, the switching states of the first switching circuit are opposite to those in the first phase, the second stage and the third stage, respectively, and in the fifth phase, the seventh phase and the eighth phase, the switching states of the second switch circuit are opposite to those in the first phase, the third stage and the fourth phase, respectively.

7. The interleaved LLC half-bridge series resonant converter according to claim 1, wherein the first outer column and the second outer column are respectively divided into a first magnetic column portion and a second magnetic column portion by a first air gap and a second air gap, respectively.

8. The interleaved LLC half-bridge series resonant converter according to claim 7, wherein the first primary winding is wound on the first outer column of the first magnetic column portion, and the first secondary winding is wound on the second outer column of the first magnetic column portion; and
wherein the second primary winding is wound on the first outer column of the second magnetic column portion, and the second secondary winding is wound on the second outer column of the second magnetic column portion.

9. The interleaved LLC half-bridge series resonant converter according to claim 7, wherein widths of the first air gap and the second air gap depend on inductance values of the first magnetizing inductor and the second magnetizing inductor, respectively, and the inductance values satisfy soft-switching conditions in which the first switch circuit and the second switch circuit are zero-voltage-switched to ON state, and the soft-switching conditions are designed to be related to operation frequencies, dead-zone time and switching parasitic capacitances.

* * * * *